US008458068B2

(12) United States Patent
Williams et al.

(10) Patent No.: US 8,458,068 B2
(45) Date of Patent: Jun. 4, 2013

(54) MONITORING IN AN AUTOMATED CLEARING HOUSE PROCESSING ENVIRONMENT

(75) Inventors: Geoffrey R. Williams, Midlothian, TX (US); Willard H. Waldron, III, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 614 days.

(21) Appl. No.: 12/651,784

(22) Filed: Jan. 4, 2010

(65) Prior Publication Data
US 2011/0166975 A1 Jul. 7, 2011

(51) Int. Cl.
*G06Q 40/00* (2012.01)

(52) U.S. Cl.
USPC ............... 705/35; 705/36; 705/38; 705/39; 705/40; 235/380

(58) Field of Classification Search
USPC ............... 705/35, 36, 38, 39, 40; 235/380
See application file for complete search history.

(56) References Cited

U.S. PATENT DOCUMENTS

| 6,254,000 | B1 * | 7/2001 | Degen et al. | 235/380 |
| 7,617,153 | B1 * | 11/2009 | Kenny et al. | 705/40 |
| 2002/0042773 | A1 * | 4/2002 | Fugitte et al. | 705/39 |
| 2003/0018557 | A1 * | 1/2003 | Gilbert et al. | 705/36 |
| 2007/0174191 | A1 * | 7/2007 | Keaton et al. | 705/40 |
| 2008/0114673 | A1 * | 5/2008 | Targett et al. | 705/38 |
| 2008/0133403 | A1 * | 6/2008 | Hamzeh | 705/39 |
| 2009/0012889 | A1 * | 1/2009 | Finch | 705/35 |

* cited by examiner

*Primary Examiner* — Siegfried E Chencinski
(74) *Attorney, Agent, or Firm* — Michael A. Springs; Moore & Van Allen, PLLC; James C. Edwards

(57) ABSTRACT

Systems, methods, and computer program products provide for monitoring activities related to Automated Clearing House (ACH) processing and, in specific embodiments, monitoring activities related to ACH in processing in shared ACH processing environment in which two or more financial institutions share access to the shared ACH processing platform. The monitoring provides for determining that events associated with a respective monitored ACH processes trigger a respective alarm, generating the alarm messages based on the triggering events and providing for computer network access to results of the monitoring including the one or more alarm messages. As such the present invention provides real-time visibility to process owners regarding the health of their processes. Thereby, allowing the process owners the ability to address processing problems as they occur and mitigate overall risk involved in the processing.

59 Claims, 15 Drawing Sheets

MONITORING IN AN AUTOMATED CLEARING HOUSE PROCESSING ENVIRONMENT

FIELD

In general, embodiments of the invention relate to methods, systems, apparatus and computer program products for monitoring in an Automated Clearing House (ACH) processing environment and, more particularly, providing an application that provides for real-time monitoring of events, such as events triggering alarms, in an ACH processing environment.

BACKGROUND

The Automated Clearing House (ACH) has fast become one of the most efficient ways to automate the processing of financial transactions, and is one of the most valuable and cost-effective services that a financial institution can offer to its customers. ACH is an automated "batch process" universal funds transfer system, governed by the rules of the National Automated Clearing House Association (NACHA), which provides for the inter banking clearing electronic entries by participating financial institutions. Specifically, ACH processes large volumes of credit and debit transactions in batches. ACH credit transfers include direct deposit payroll, direct payment, business-to-business payments, e-checks, e-commerce payments, tax payments and the like. ACH direct debit transfers include consumer payments on insurance premiums, mortgage loans and other types of bill payments.

According to NACHA, annual electronic payment volume doubles every five years. In 2007, nearly 14 billion ACH payments were made.

Traditionally, each financial institution that participated in the ACH process provided their own proprietary processing platform. In order to create efficiencies of scale, shared ACH processing platforms have been created that allow for two or more financial institutions to leverage market-leading payment capabilities and product solutions. One such shared ACH processing platform is the Pariter Solution, formed as a Joint venture between Bank of America and Well Fargo and Company. Shared ACH processing platforms, such as Pariter or the like, combine the strengths of the participating financial institutions in advanced processing technology and high payment volume to create a more efficient platform. Additionally, shared ACH processing facilitates greater investment in innovation to deliver added value to clients through increased speed, broader product capability and capacity for higher volumes of cross-border payments.

One problem paramount to ACH processing and, specifically shared ACH processing, is the ability to monitor the process and provide real-time visibility to process owners regarding the health of their processes. For example, exception processing requires monitoring. An "exception" is the term used for an ACH item which could not post to an account for some specified reason, such as insufficient funds, account closed, lack of matching account number or the like. In another example, monitoring is necessary to determine whether a file or batch of files made it into one financial institution's transfer station and continued downstream to the shared landing zone or vice versa. Such exceptions or other events, such as failure to receive an acknowledgement of file(s) received or the like may prompt the system to generate an alarm message. Monitoring of such alarms is necessary to insure that action is taken to rectify the problem that caused the alarm. Without proper procedures and applications in place to monitor the alarms, on a real-time basis, the problems that caused the alarms can escalate adding further delays and inefficiencies to the ACH processing process.

Therefore, a need exists to develop systems, methods, computer program products and the like for monitoring events, such as events triggering alarms, in an ACH processing environment and, moreover, a shared ACH processing environment. The desired system should provide an automated approach to detecting the presence of exceptions or other events adverse to ACH processing. The automated nature of the desired system and methods provides for real-time monitoring of ACH processing, which is essential in mitigating or eliminating problems as they occur and maintaining operability of the ACH processing system.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for monitoring activities related to Automated Clearing House (ACH) processing and, in specific embodiments, monitoring activities related to ACH processing in shared ACH processing environment in which two or more financial institutions share access to the shared ACH processing platform. The monitoring provides for determining that events associated with a respective monitored ACH processes trigger a respective alarm, generating the alarm messages based on the triggering events and providing for computer network access to results of the monitoring including the one or more alarm messages. As such the present invention provides real-time visibility to process owners regarding the health of their processes. Thereby, allowing the process owners the ability to address processing problems as they occur and mitigate overall risk involved in the processing.

One embodiment of the invention is defined by a system for managing Automated Clearing House (ACH) processing. The system includes a financial-institution-based ACH transfer station including a financial institution ACH file landing zone, a shared ACH processing platform landing zone, a file processor and transfer station storage. The system additionally includes an ACH monitoring apparatus including at least one processor and a memory. The memory includes an ACH monitoring application configured to monitor a plurality of activities occurring at the ACH transfer station, determine that one or more events associated with a respective monitored activity trigger a respective alarm and generate the one or more alarm messages based on the triggering event. The memory also includes an ACH monitoring dashboard application configured to provide computer network access to results of the monitoring including the one or more alarm messages.

In accordance with specific embodiments of the system, ACH monitoring dashboard application is further configured to provide for computer network access to results of the monitoring, such as, at least one of processing statistics, intraday summary statistics, key performance indicators or graphical representations associated with processing statistics, intraday summary statistics or key performance indicators. In other specific embodiments of the system, the ACH monitoring dashboard application is further configured to provide for computer network access to a research repository that provides for searching of file status based on predetermined file criteria. In still further specific embodiments of the system, the ACH monitoring dashboard application is further configured to provide for computer network access a confidence indicator that indicates the confidence of the monitoring process based on health the associated data sources.

Another specific embodiment of the system includes an infrastructure monitoring apparatus including at least one processor and a memory. The memory includes an infrastructure monitoring application configured to monitor performance of infrastructure components associated with ACH processing, determine that performance of one or more infrastructure components meets a predetermined performance threshold and generate one or more infrastructure alarm messages based on respective infrastructure components meeting the predetermined performance threshold. In such embodiments of the system, the ACH monitoring dashboard application is further configured to provide for computer network access to the infrastructure alarm messages. The thresholds that determine infrastructure alarms serve to provide predictive correlation between infrastructure performance and events that trigger other ACH processing alarms.

In one embodiment of the system, the ACH monitoring application is further configured to monitor acknowledgement of outbound ACH files sent from the ACH transfer station to a shared ACH processing platform and acknowledgement of inbound ACH files sent from the shared ACH processing platform to the ACH transfer station. In such embodiments, the ACH monitoring application is further configured to determine that a file acknowledgement has not been received by the financial institution or generated by the financial institution within a predetermined time threshold and generate a file acknowledgement alarm message based on the determination. In such embodiments, the ACH monitoring dashboard application is further configured to provide computer network access to the file acknowledgement alarm message.

In another embodiment of the system, the ACH monitoring application is further configured to monitor compliance of a file received by the ACH transfer station or received by a shared ACH processing platform. In such embodiments, the ACH monitoring application is further configured to determine that a file received by the ACH transfer station is non-compliant or receive notification from the shared ACH processing platform that a file is non-compliant and generate a non-compliant file alarm message based on the determination. Likewise, in such embodiments, the ACH monitoring dashboard application is further configured to provide computer network access to the non-compliant file alarm message.

In yet another embodiment of the system, the ACH monitoring application is further configured to monitor receipt of scheduled files sent from an internal source to the ACH transfer station on predetermined schedules and receipt of scheduled files sent from a shared ACH processing platform to the ACH transfer station. In such embodiments, the ACH monitoring application is further configured to determine that a scheduled file to be sent from the internal source or the shared ACH processing platform has not been received within a predetermined time threshold and generate a scheduled file alarm message based on the determination. Likewise, in such embodiments, the ACH monitoring dashboard application is further configured to provide network access to the scheduled file alarm message.

In a still further embodiment of the system, the Ach monitoring application is further configured to monitor a volume of files received at the financial institution ACH file landing versus a volume of files sent by the financial institution ACH file landing zone or a volume of files received at the shared ACH processing platform landing zone versus a volume of files sent by the shared ACH processing platform landing zone. In such embodiments, the ACH monitoring application is further configured to determine that the volume of files received at either the financial institution ACH file landing zone or the shared ACH processing platform is not equivalent to volume of files sent by the financial institution ACH file landing zone or the shared ACH processing platform and generate an outgoing alarm message based on the determination. Likewise, in such embodiments, the ACH monitoring dashboard application is further configured to provide computer network access to the outgoing alarm message.

Further, in accordance with another embodiment of the system, the ACH monitoring application is further configured to monitor occurrence and frequency of invoking file control activities at the ACH file landing zone and the shared ACH processing platform landing zone. In such embodiments, the ACH monitoring application is further configured to determine that a predetermined file control activity has occurred or that a predetermined volume of file control activities has occurred over a predetermined time period and generate a file control alarm message based on the determination. Likewise, in such embodiments, the ACH monitoring dashboard application is further configured to provide computer network access to the file control alarm message.

Moreover, in accordance with another embodiment of the system, the ACH monitoring application is further configured to monitor a plurality of reoccurring events performed at the ACH transfer station and the at the shared ACH processing platform. In such embodiments, the ACH monitoring application is further configured to determine that one or more of the reoccurring events have not been initiated or completed within a predetermined time and generate a service delivery alarm message based on the determination. Likewise, in such embodiments, the ACH monitoring dashboard application is further configured to provide computer network access to the service delivery alarm message.

An apparatus for managing Automated Clearing House (ACH) processing defines another embodiment of the invention. The apparatus includes a computer platform including at least one processor and a memory. The apparatus additionally includes an ACH monitoring dashboard application stored in the memory, executable by the processor. The ACH monitoring dashboard application is configured provide computer network access to ACH process monitoring results including a plurality of alarm messages associated with ACH processing events.

In one specific embodiment of the apparatus, the ACH dashboard application is further configured to present the ACH process monitoring results in a first zone area configured to display alarm type icons that indicate the current state of alarms for each alarm type. Additionally, the ACH dashboard application is further configured to present the ACH process monitoring results in a second zone area configured to display real-time ACH processing statistics. Moreover, the ACH dashboard application is further configured to present ACH processing monitoring results in a third zone area configured to display alarm messages or access to alarm messages for a specific monitoring activity. In such embodiments, the ACH dashboard application is further configured to display the first zone area proximate an upper-left hand corner, display the second zone area proximate a lower-left hand corner and display the third zone area on a right-side adjacent to the first zone area and the second zone area.

In further specific embodiments of the apparatus, the ACH monitoring dashboard application is further configured to present at least one of processing statistics, intraday summary statistics, key performance indicators or graphical representations associated with processing statistics, intraday summary statistics or key performance indicators. In other specific embodiments of the apparatus, the ACH monitoring dashboard application is further configured to present a research repository that is configured to provide for searching of file status based on predetermined file criteria. In still further specific embodiments of the apparatus, the ACH monitoring dashboard application is further configured to present a confidence indicator that indicates a real-time confidence of the monitoring process. Moreover, in further embodiments of the apparatus, the ACH monitoring dashboard application is further configured to present ACH processing infrastructure component performance indicators and infrastructure alarm messages.

A method for managing Automated Clearing House (ACH) processing provides for another present embodiment of the invention. The method includes monitoring, at a computing device, a plurality of Automated Clearing House (ACH) processes and determining, at a computing device, that one or more events associated with a respective monitored ACH processes trigger a respective alarm. The method further includes generating, at a computing device, one or more alarm messages based on the triggering events and providing for computer network access to results of the monitoring including the one or more alarm messages.

In one specific embodiment of the method, monitoring further includes monitoring, at the computing device, acknowledgement of outbound ACH files sent from a financial institution to a shared ACH processing platform and acknowledgement of inbound ACH files sent from the shared ACH processing platform to the financial institution. In such embodiments, determining further includes determining, at the computing device, that a file acknowledgement has not been received by the financial institution or generated by the financial institution within a predetermined time threshold. Likewise, generating further includes generating, at the computing device, a file acknowledgement alarm message that indicates failure to receive a file acknowledgement or failure to generate a file acknowledgement and providing further includes providing computer network access to the file acknowledgement alarm message.

In another specific embodiment of the method, monitoring further includes monitoring, at the computing device, compliance of a file received by a financial institution or received by a shared the ACH processing platform. In such embodiments, determining further includes determining, at the computing device, that a file received by the financial institution or the shared ACH processing platform is non-compliant. Likewise, generating further includes generating, at the computing device, a non-compliant file alarm message that indicates the non-compliance of a file received by the financial institution or the shared ACH processing platform and providing further includes providing computer network access to the non-compliant file alarm message.

In yet another embodiment of the method, monitoring further includes monitoring, at the computing device, receipt of scheduled files sent from an internal source to a financial institution on predetermined schedules and receipt of scheduled files sent from a shared ACH processing platform to the financial institution. In such embodiments, determining further includes determining, at the computing device, that a scheduled file to be sent from the internal source or the shared ACH processing platform has not been received with a predetermined time threshold. Likewise, generating further includes generating, at the computing device, a scheduled file alarm message that indicates failure to receive a scheduled file from the internal source or the shared ACH processing platform and providing further includes providing computer network access to the scheduled file alarm message.

In still another embodiment of the method, monitoring further includes monitoring, at the computing device, volume of files received at the financial institution versus volume of files sent by the financial institution. In such embodiments, determining further includes determining, at the computing device, that the volume of files received at the financial institution is not equivalent to volume of files sent by the financial institution. Moreover, generating further includes generating, at the computing device, an outgoing alarm message that indicates that the volume of files received at the financial institution is not equivalent to volume of files sent by the financial institution and providing further includes providing computer network access to the outgoing alarm message.

In another specific embodiment of the method, monitoring further comprises monitoring occurrence and frequency of invoking file control activities. In such embodiments, determining further includes determining, at the computing device, that a predetermined file control activity has occurred or that a predetermined volume of file control activities has occurred over a predetermined time period. Further, generating further includes generating, at the computing device, a file control alarm message that indicates occurrence of a file control activity or frequency of file control activities and providing further includes providing computer network access to the file control alarm message.

In another embodiment the method includes monitoring, at a computing device, performance of infrastructure components associated with ACH processing, determining, at a computing device, that performance of one or more infrastructure components meets a predetermined performance threshold, generating, at a computing device, one or more infrastructure alarm messages based on respective infrastructure components meeting the predetermined performance threshold and providing for computer network access to the infrastructure alarm messages.

In still further embodiments of the method, providing further included providing for computer network access to results of the monitoring including at least one of processing statistics, intraday summary statistics, key performance indicators or graphical representations associated with processing statistics, intraday summary statistics or key performance indicators.

A computer program product that includes a computer-readable medium defines yet another embodiment of the invention. The medium includes a first set of codes for causing a computer to monitor a plurality of Automated Clearing House (ACH) processes and a second set of codes for causing a computer to determine that one or more events associated with a respective monitored ACH processes trigger a respective alarm. The medium additionally includes a third set of codes for causing a computer to generate one or more alarm messages based on the triggering events and a fourth set of codes for causing a computer to provide for computer network access to results of the monitoring including the one or more alarm messages.

In specific embodiments of the computer program product, the first set of codes is further configured to cause the computer to monitor one or more of acknowledgement of outbound ACH files sent from a financial institution to a shared ACH processing platform, acknowledgement of inbound ACH files sent from the shared ACH processing platform to the financial institution, compliance of a file received by a financial institution or received by a shared ACH processing platform, receipt of scheduled files sent from an internal source to a financial institution on predetermined schedules and receipt of scheduled files sent from a shared ACH processing platform to the financial institution, volume of files received at the financial institution versus volume of files sent by the financial institution, occurrence and frequency of invoking file control activities or a plurality of reoccurring events associated with a financial institution and the shared ACH processing platform. In such embodiments, the third set of codes is further configured to cause the computer network to generate one or more of file acknowledgement alarm messages, non-compliant file alarm messages, scheduled file alarm messages, outgoing alarm messages, a file control alarm messages, service delivery alarm messages or infrastructure alarm messages based on the triggering events.

In other specific embodiments of the computer program product, the fourth set of codes is further configured to cause the computer to provide for computer network access to results of the monitoring, the results include at least one of processing statistics, intraday summary statistics, key performance indicators or graphical representations associated with processing statistics, intraday summary statistics or key performance indicators.

Thus, systems, apparatus, methods, and computer program products described in detail below for monitoring activities related to Automated Clearing House (ACH) processing and, in specific embodiments, monitoring activities related to ACH processing in shared ACH processing environment in which two or more financial institutions share access to the shared ACH processing platform. The monitoring provides for determining that events associated with a respective monitored ACH processes trigger a respective alarm, generating the alarm messages based on the triggering events and providing for computer network access to results of the monitoring including the one or more alarm messages. As such the present invention provides real-time visibility to process owners regarding the health of their processes. Thereby, allowing the process owners the ability to address processing problems as they occur and mitigate overall risk involved in the processing.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
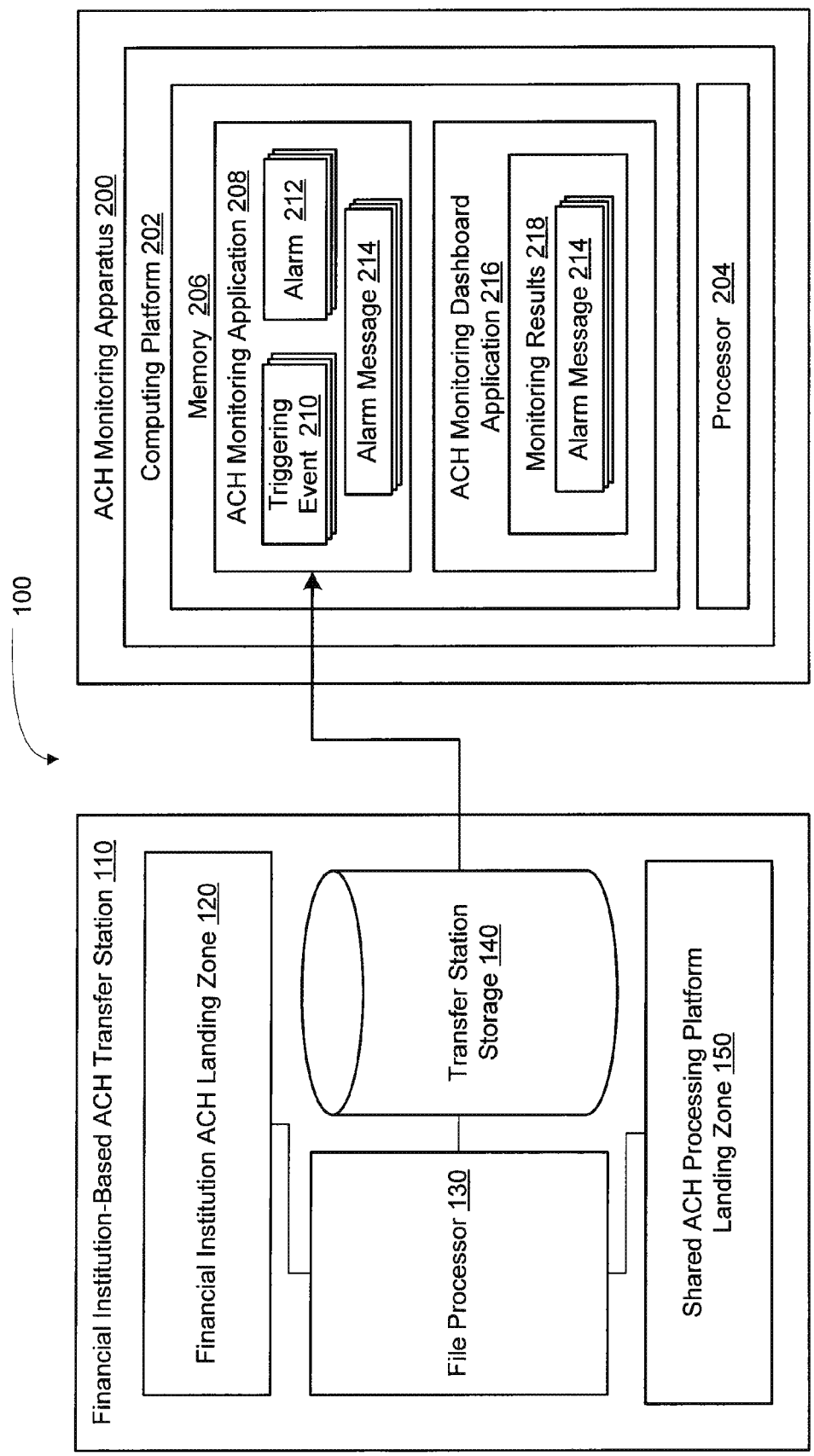
Figure 2:
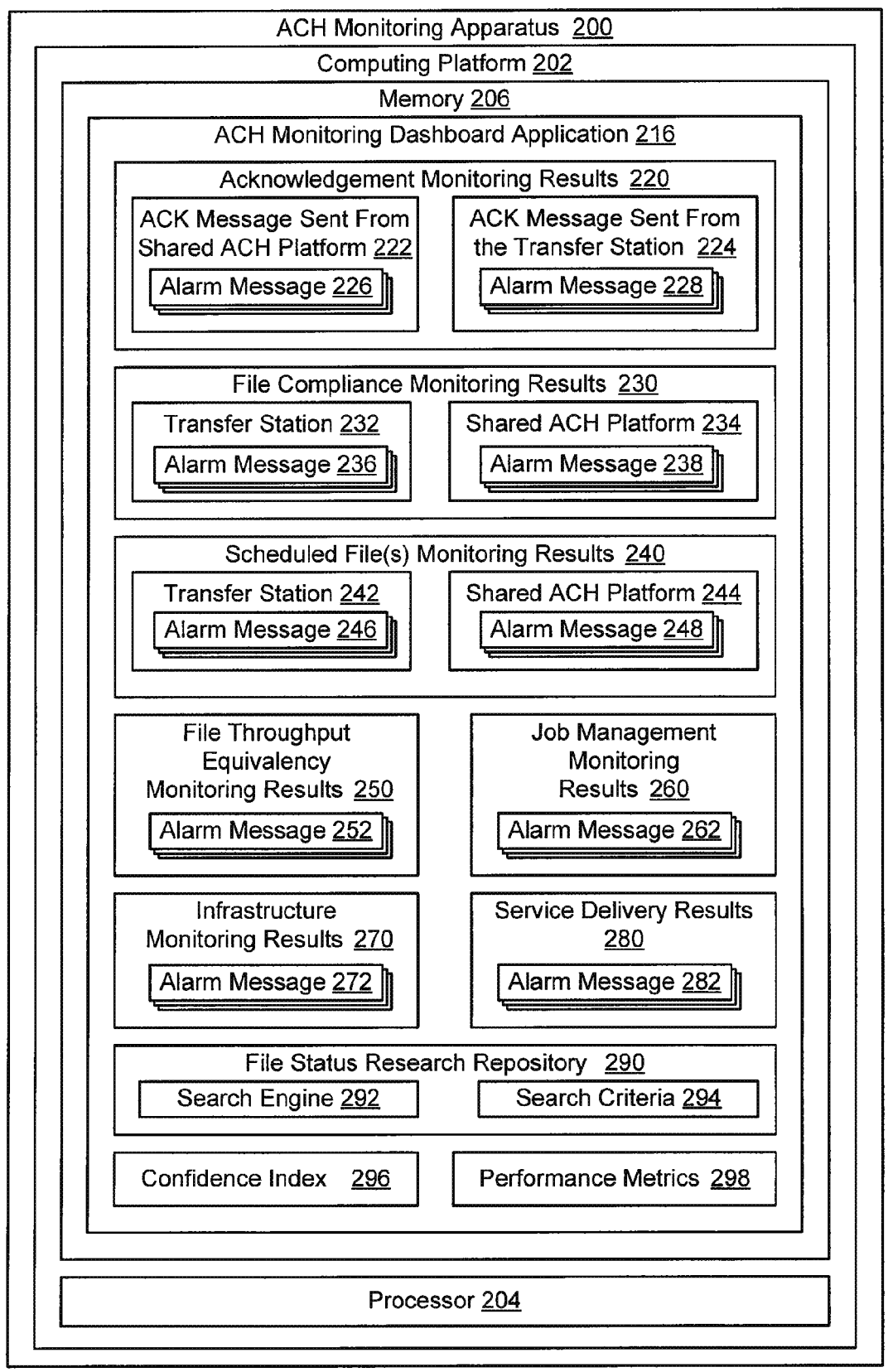
Figure 3:
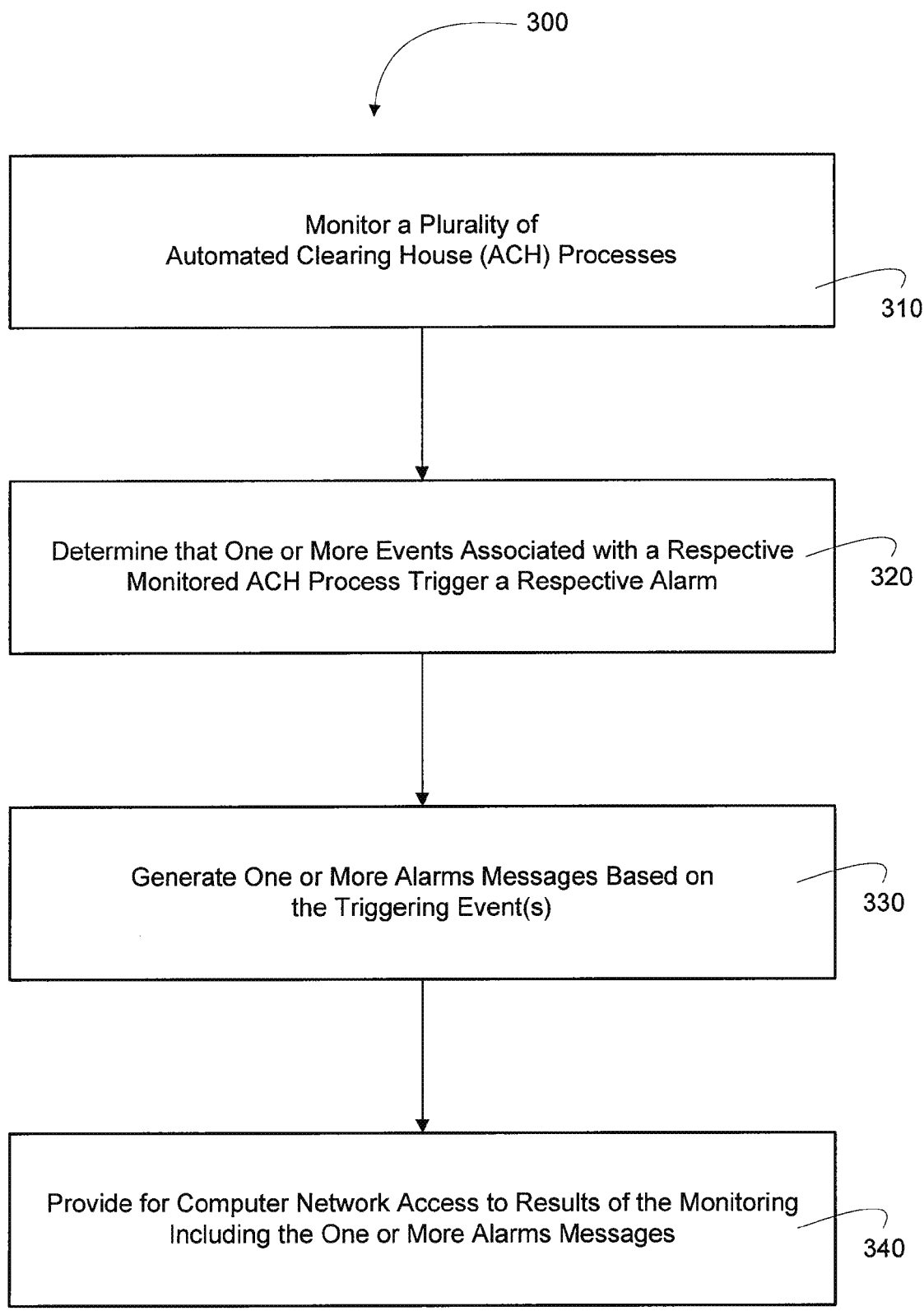
Figure 4:
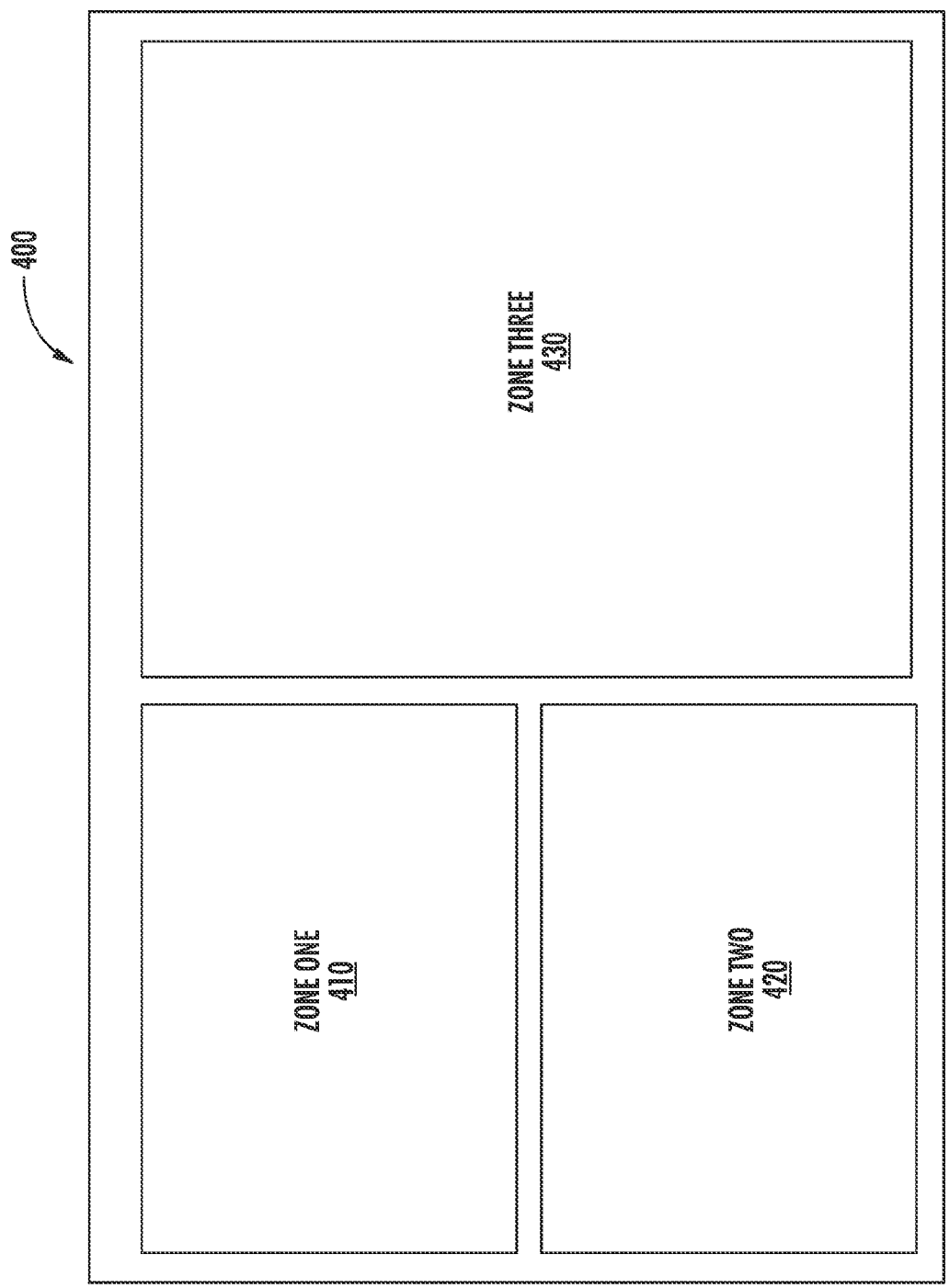
Figure 5:
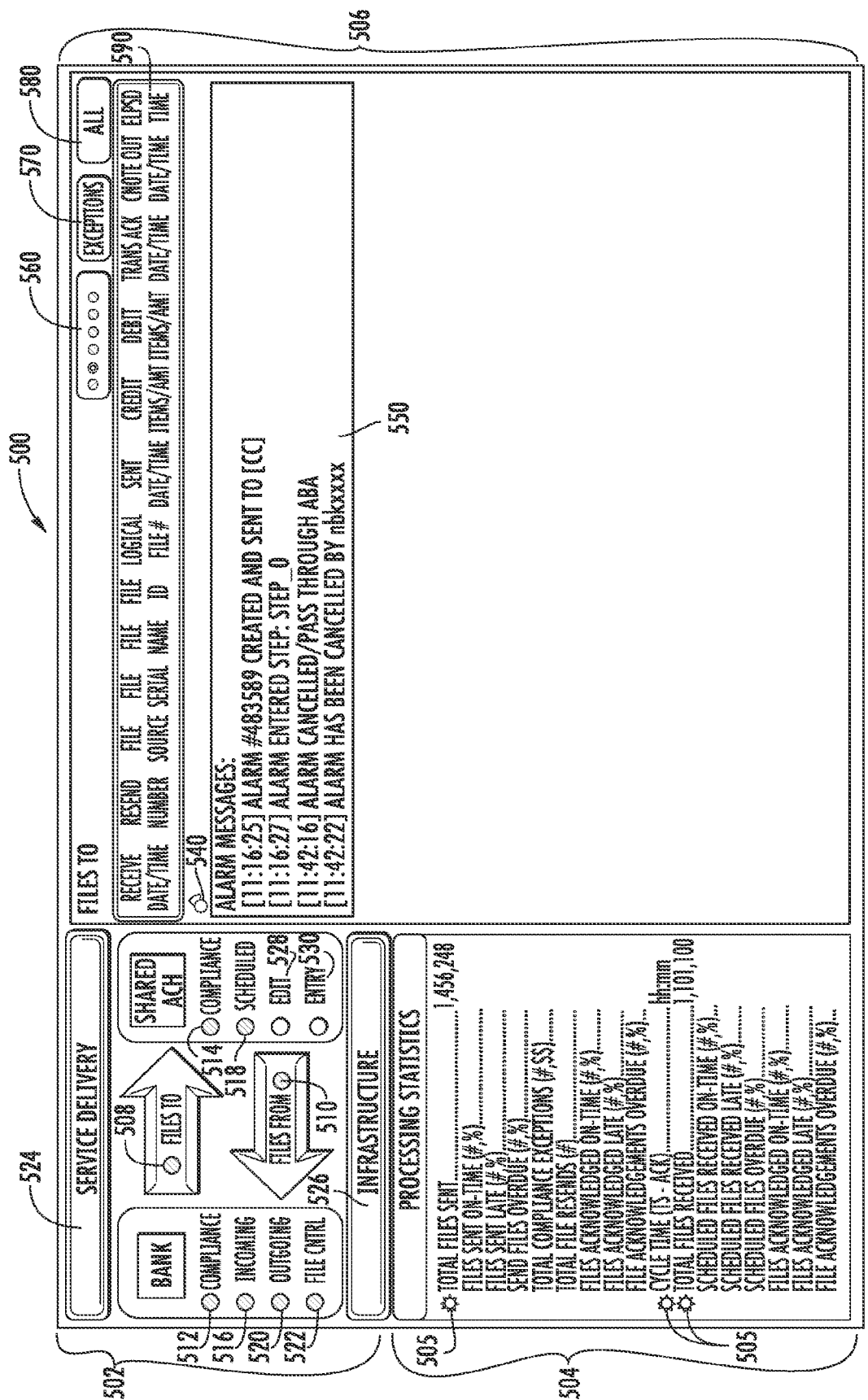
Figure 6:
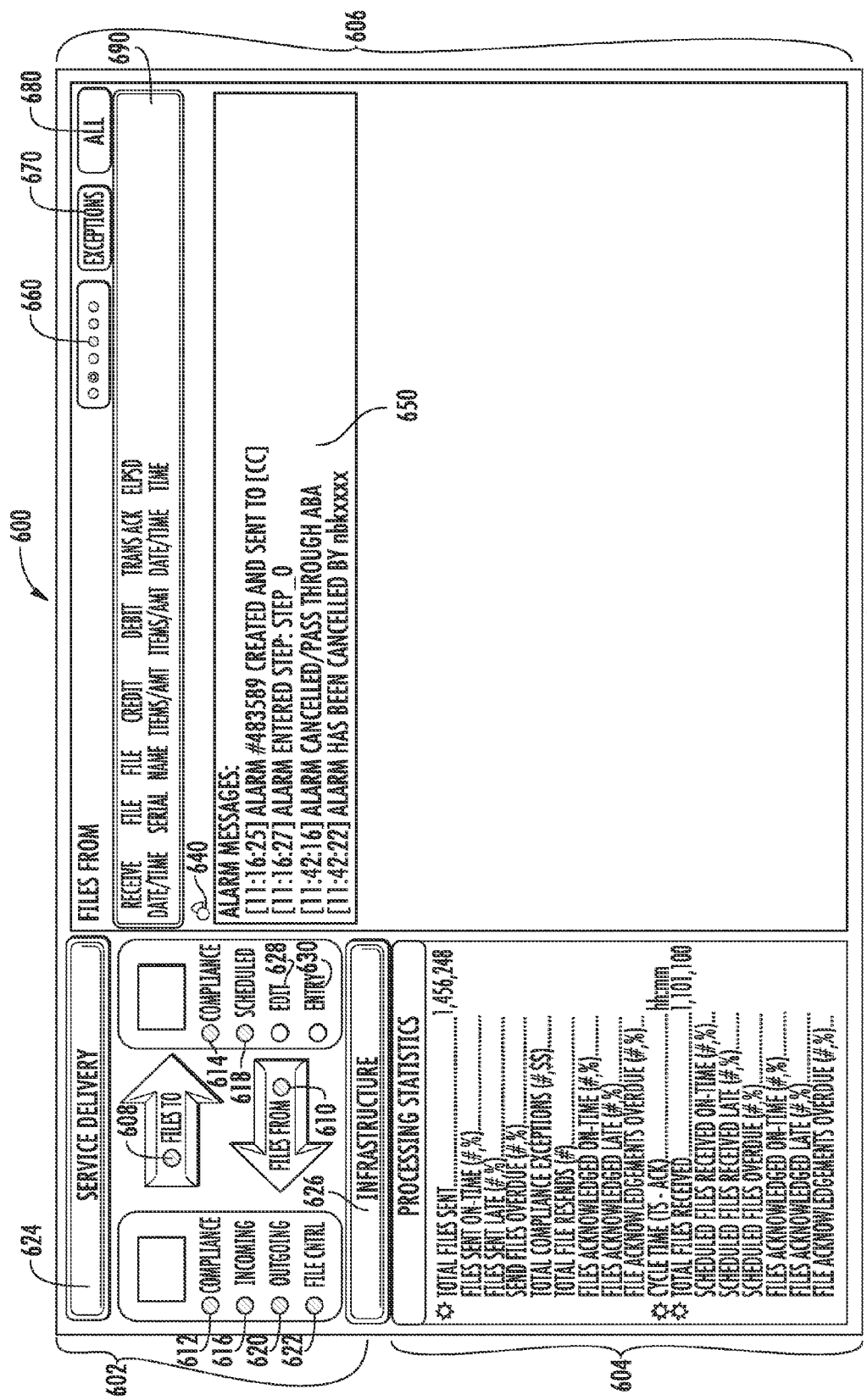
Figure 7:
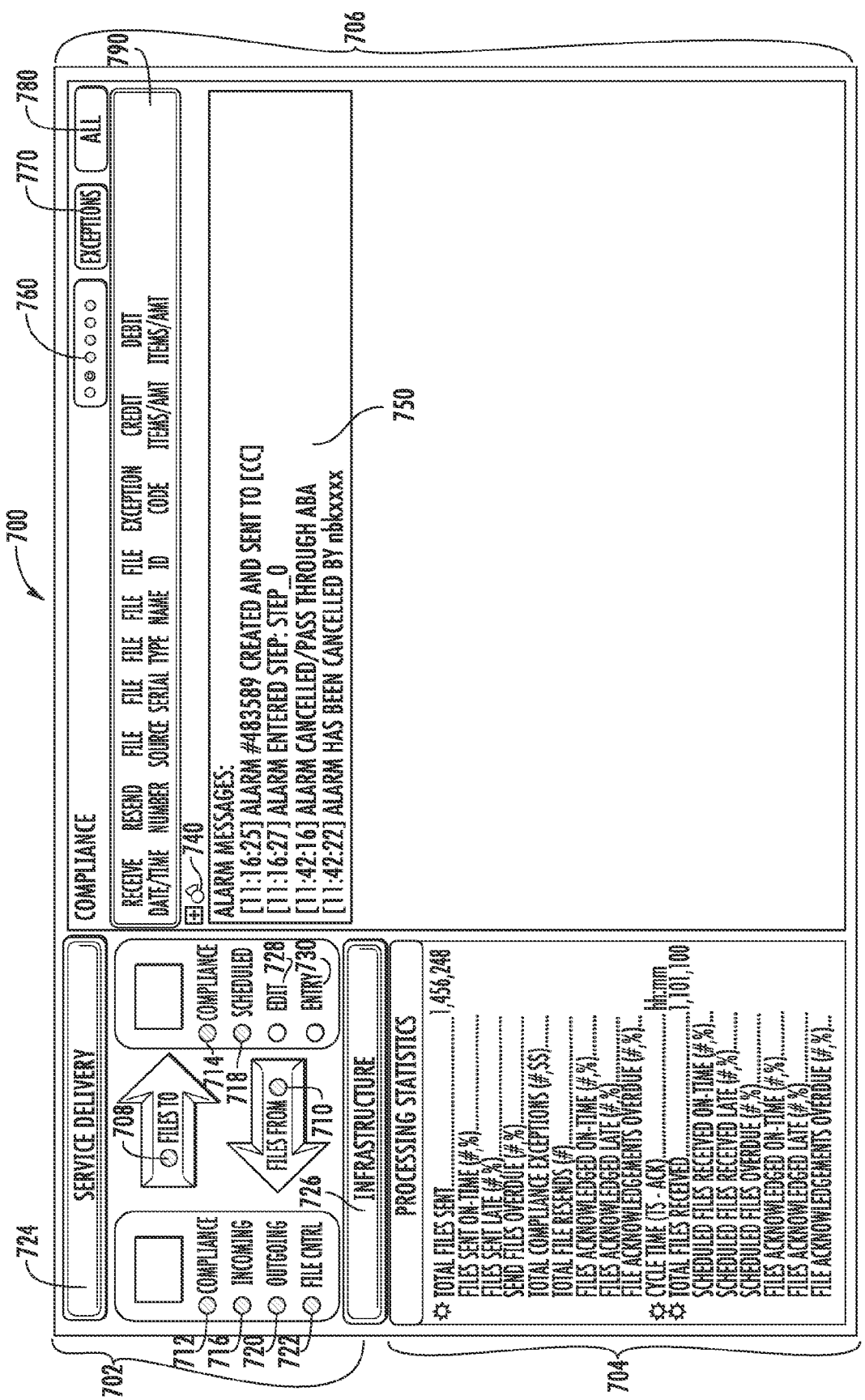
Figure 8:
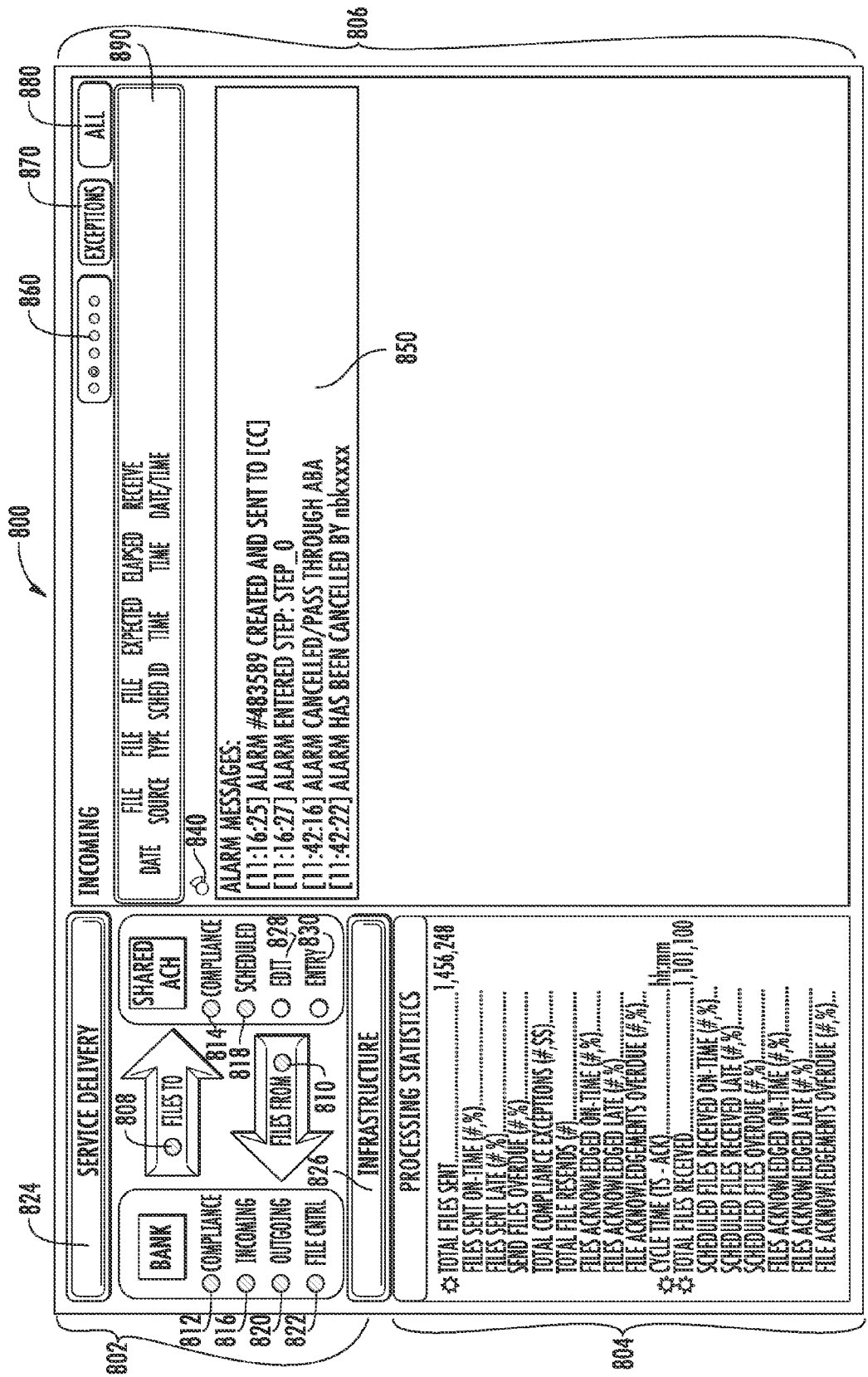
Figure 9:
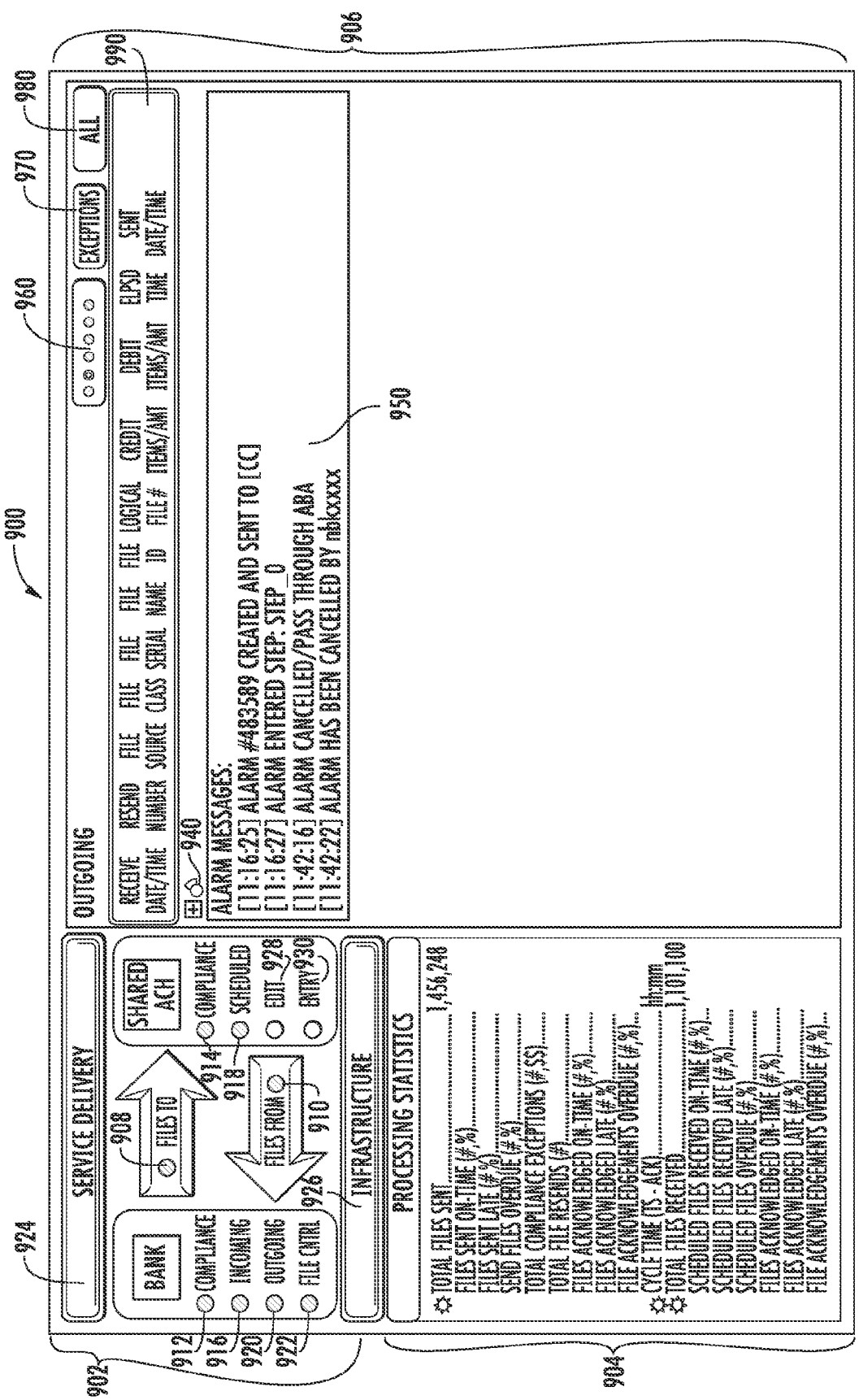
Figure 10:
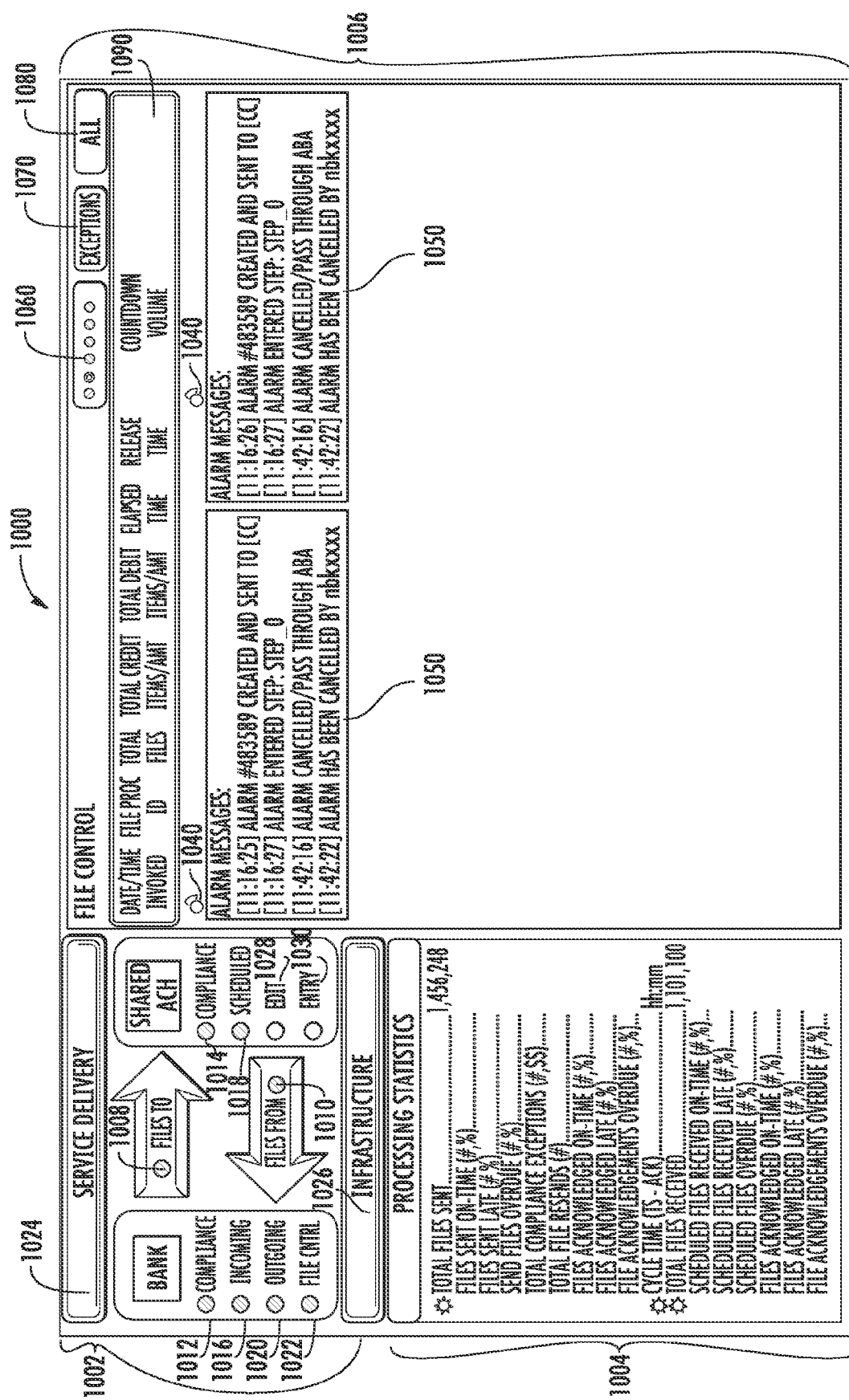
Figure 11:
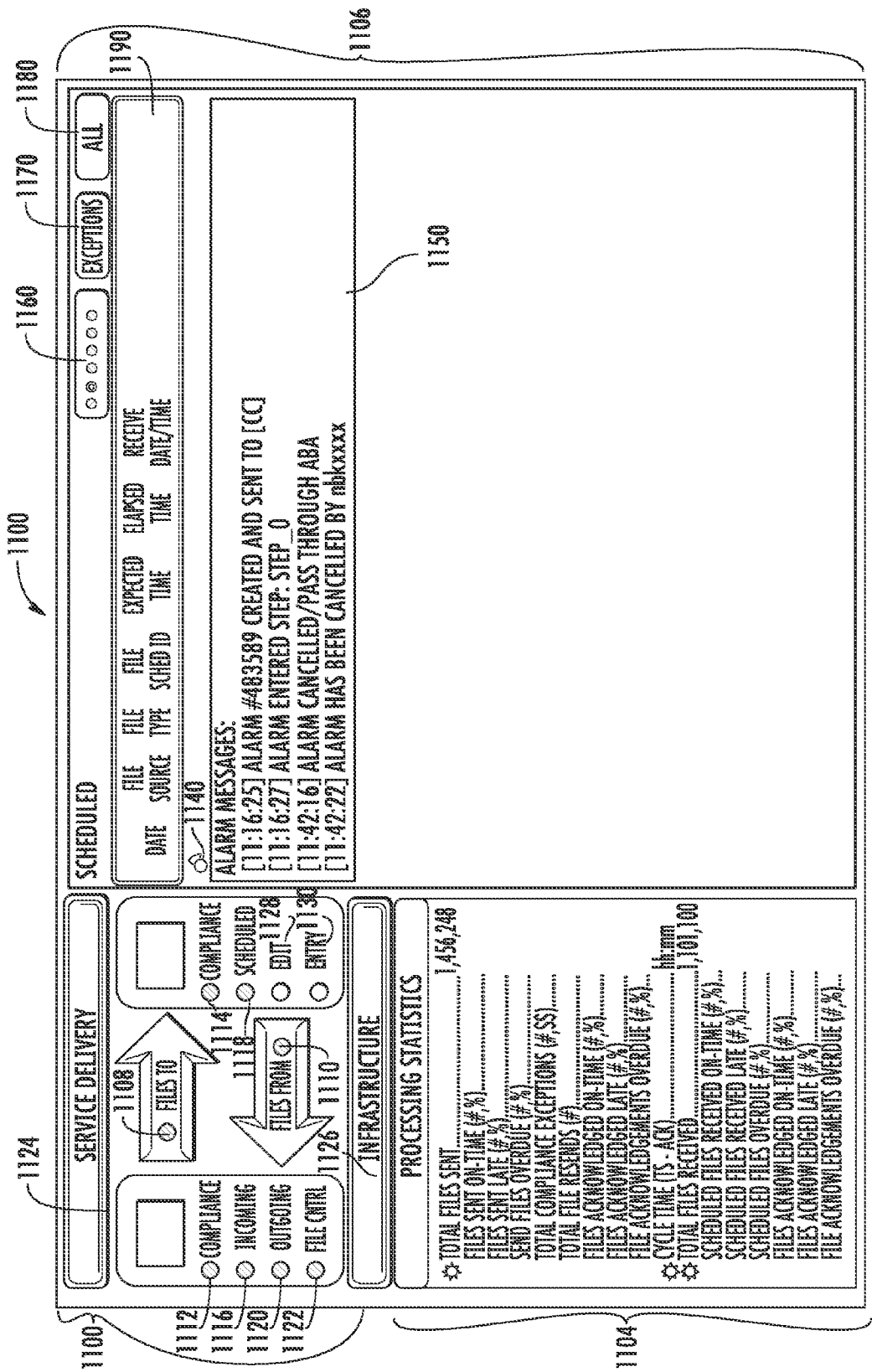
Figure 12:
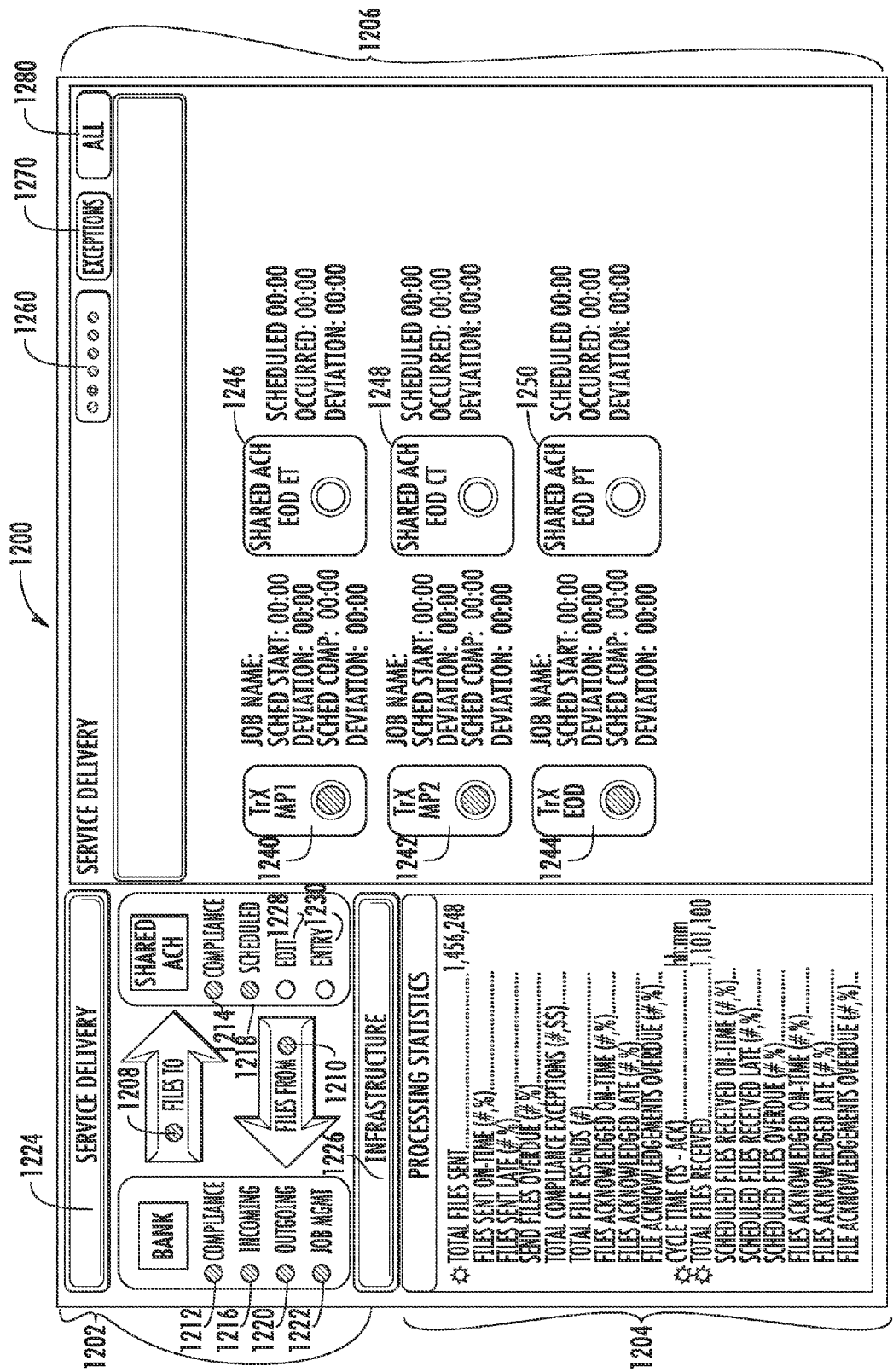
Figure 13:
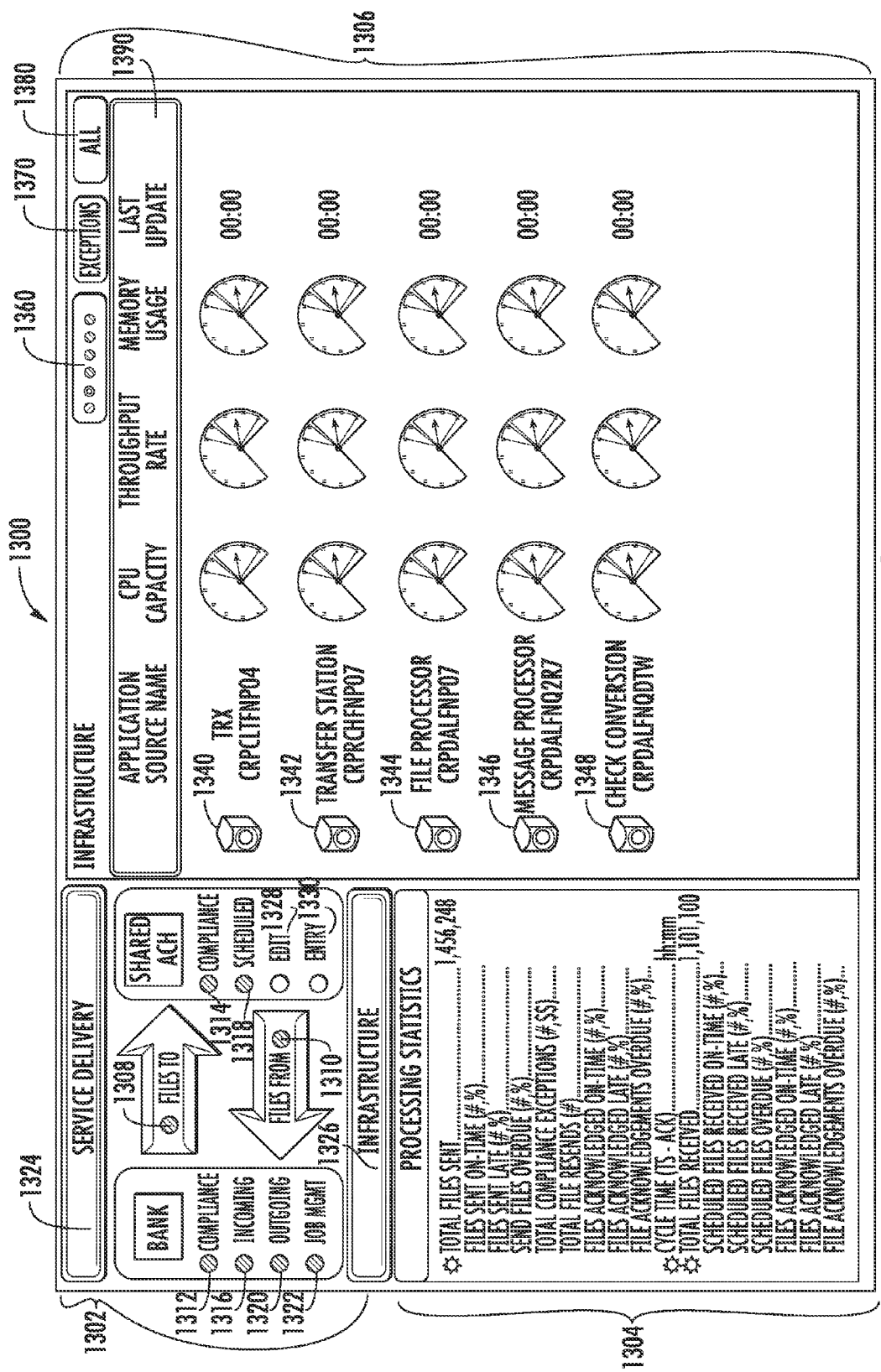
Figure 14:
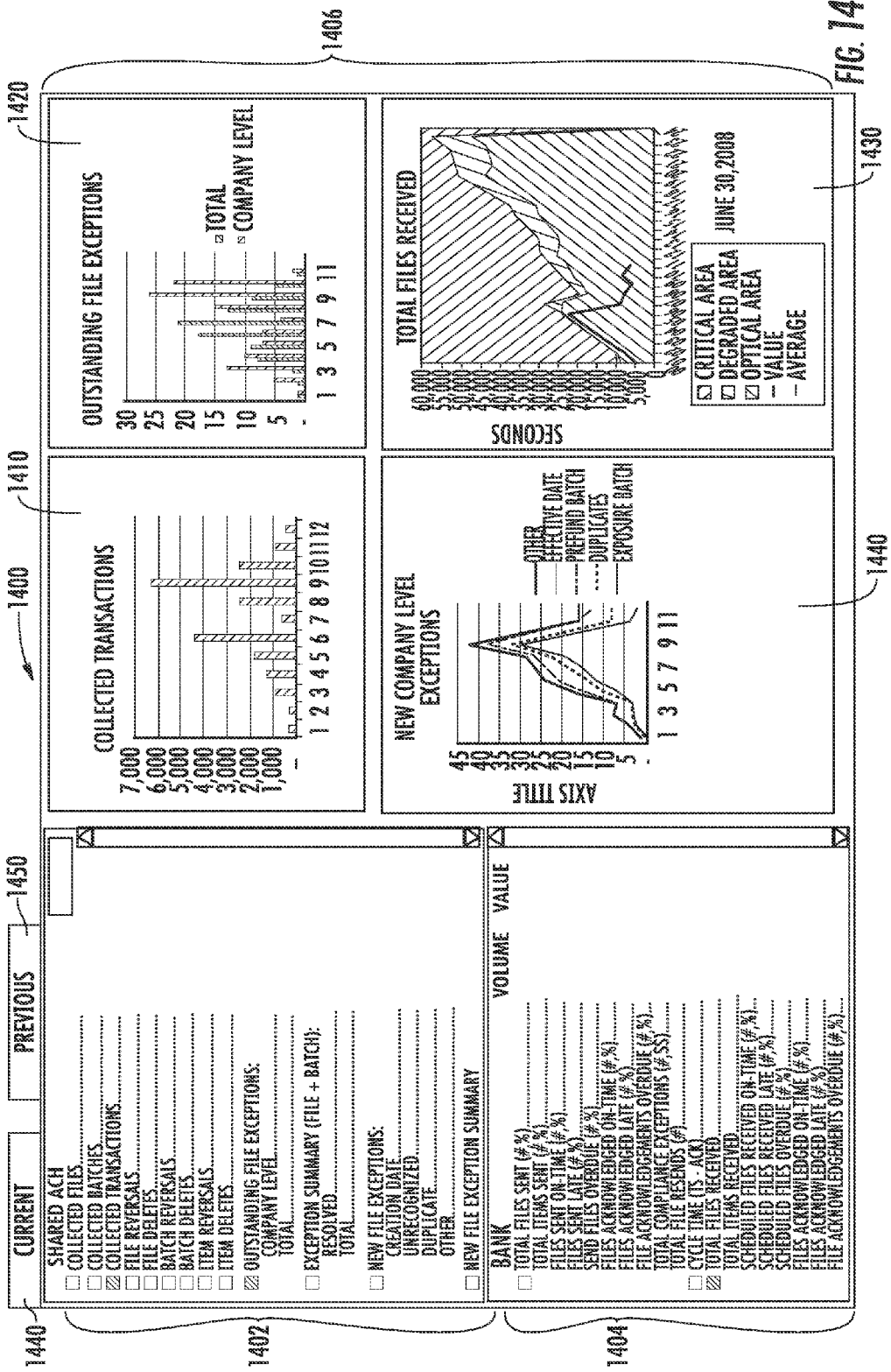
Figure 15:
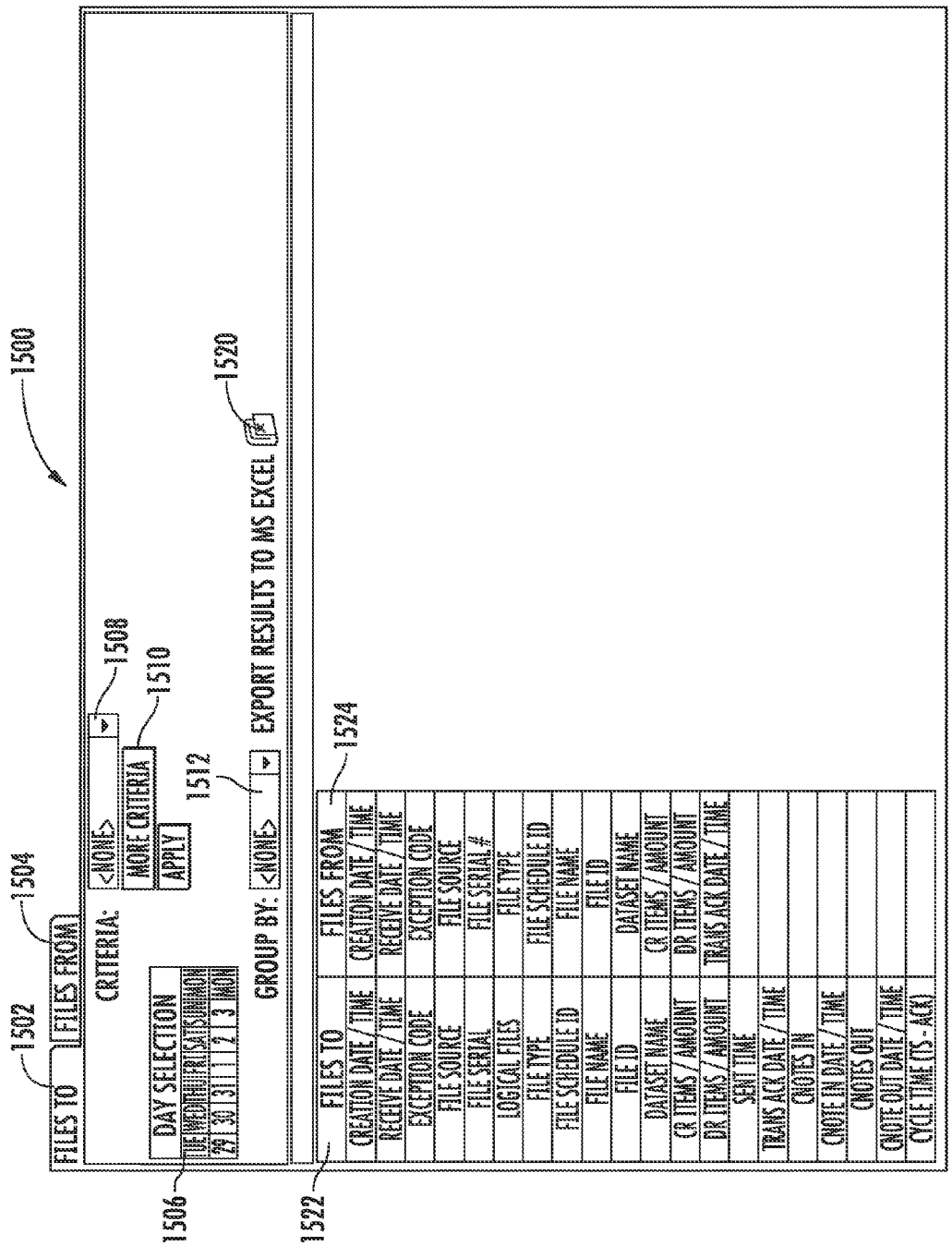

Having thus described embodiments of the invention in general terms, reference will now be made to the accompanying drawings, which are not necessarily drawn to scale, and wherein:

FIG. 1 is a block diagram of an system for managing exceptions/alarms in a shared Automated Clearing House (ACH) processing environment, in accordance with embodiments of the present invention;

FIG. 2 is a block diagram of an apparatus configured for providing an ACH monitoring dashboard application, in accordance with embodiments of the present invention;

FIG. 3 is a flow diagram of a method for managing ACH processing, in accordance with another embodiment of the invention;

FIG. 4 is a block diagram of information presentation zones in an ACH monitoring dashboard application, in accordance with embodiments of the present invention;

FIG. 5 is an example of a files to/acknowledgement exception dashboard, in accordance with an embodiment of the present invention;

FIG. 6 is an example of a files from/acknowledgement exception dashboard, in accordance with embodiments of the present invention;

FIG. 7 is an example of a compliance exception dashboard, in accordance with embodiments of the present invention;

FIG. 8 is an example of a scheduled incoming file exception dashboard, in accordance with embodiments of the present invention;

FIG. 9 is an example of an outgoing/file throughput equivalency exception dashboard. In accordance with embodiments of the present invention;

FIG. 10 is an example of a file control activity exception dashboard, in accordance with embodiments of the present invention;

FIG. 11 is an example of a scheduled shared ACH processing platform file exception dashboard, in accordance with further embodiments of the invention;

FIG. 12 is an example of a service delivery exception dashboard, in accordance with embodiment of the present invention;

FIG. 13 is an example of an infrastructure exception dashboard, in accordance with further embodiments of the present invention;

FIG. 14 is an example of a performance metric and related graph dashboard, in accordance with further embodiments of the invention; and FIG. 15 is an example of a research repository configured for determining the status of a specified ACH file, in accordance with yet other embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, present embodiments herein disclosed provide for monitoring activities related to Automated Clearing House (ACH) processing and, in specific embodiments, monitoring activities related to ACH processing in shared ACH processing environment in which two or more financial institutions share access to the shared ACH processing platform. The monitoring provides for determining that events associated with a respective monitored ACH processes trigger a respective alarm, generating the alarm messages based on the triggering events and providing for computer network access to results of the monitoring including the one or more alarm messages. As such the present invention provides real-time visibility to process owners regarding the health of their processes. Thereby, allowing the process owners the ability to address processing problems as they occur and mitigate overall risk involved in the processing.

Referring to FIG. 1 a block diagram is depicted of a system 100 for managing business activity in an Automated Clearing House (ACH) processing environment and, more specifically, a shared ACH processing environment, in accordance with embodiments of the present invention.

The system included a financial institution-based ACH transfer station 110 and an ACH monitoring apparatus 200. The ACH transfer station 110 includes a plurality of networked devices, such as servers, storage devices and the like, and is configured to process ACH files. In this regard, the ACH transfer station 110 includes a financial institution landing zone 120, a file processor 130, a transfer station storage 140 and a shared ACH processing platform landing zone 150.

The ACH monitoring apparatus 200, which may comprise one or more devices, includes a computing platform 202 having at least one processor 204 and a memory 206. The memory includes an ACH monitoring application 208 configured to monitor a plurality of activities and/or processes occurring at the ACH transfer station 110. In addition, the ACH monitoring application is configured to determine that one or more triggering events 210 associated with a respective monitored activity/process triggers a respective alarm 212, otherwise referred to as an exception. In response to determination of the triggering event 210, the ACH monitoring application will generate and initiate communication of one or more alarm messages 214.

The ACH monitoring apparatus 200 additionally includes ACH monitoring dashboard application 216 that is configured to provide computer network access, such as intranet access, to monitoring results 218 including the one or more alarm messages. As such, the dashboard application 216 provides real-time visibility to the alarms/exceptions 212 as they occur intraday, thereby allowing a financial institution associate charged within resolving the exception or maintaining the activity/process to address the issue surrounding the alarm/exception in an efficient and timely fashion.

The financial institution landing zone 120 receives origination ACH files (i.e., client files) sent from various external sources. The ACH files include a plurality of debit and/or credit posting items. Prior to being received at the financial institution landing zone 120 the origination ACH files will be received from the external sources/clients through various different portals. As such, the origination ACH files are received by various financial institution applications, such as posting applications or the like, and, subsequently routed to the financial institution landing zone 120 of the ACH transfer station 110 based on a predetermined schedule or the like.

The file processor 130 in communication with the financial institution landing zone 120 and is configured to collect ACH files received by the financial institution landing zone 120 and provides a high level interrogation of files received at the financial institution landing zone 120, such as format checks, header matches to insure correct volume of items and dollar amounts of items, qualifications checks, high-level edits and the like. The file processor 130 is in communication with the transfer station storage 140 that is configured to receive information related to the ACH files concurrent with the file processor 130 performing the high-level interrogation. As discussed in more detail infra. the ACH monitoring apparatus 200 will query the transfer station storage 140 on predetermined basis or an as-needed basis to acquire necessary ACH processing monitoring data. In one example, in order to insure real-time monitoring, the ACH monitoring apparatus 200 may query the transfer station storage 140 once every two minutes or the like.

Once the file processor 130 has performed the necessary high-level interrogation functions and ACH file information has been communicated to the transfer station storage 140, the ACH files are communicated to the outbound shared ACH processing platform landing station 150, which in turn, communicates the ACH files to the shared ACH processing platform (not shown in FIG. 1), which processes the ACH files accordingly and communicates necessary information, such as acknowledgments of receipt, non-compliance information, processing information, reporting information and the like to the financial institution transfer station 110 via the shared ACH processing platform landing station 150. In turn, the ACH file information returned from the shared ACH processing platform is processed by the file processor 130, communicated to the transfer station storage 140 and, subsequently, captured by the ACH monitoring apparatus 200.

The ACH monitoring application 208 is configured to monitor various activities/processes that occur in the overall ACH processing operation. The monitored activities/processes include, but are not limited to (a) receipt of acknowledgement by the financial institution transfer station 110 of files received from the shared ACH processing platform; (b) communication of acknowledgement by the financial institution transfer station 110 acknowledging receipt of information from the shared ACH processing platform; (c) ACH file compliance at the financial institution transfer station 110; (d) ACH file compliance at the shared ACH processing platform; (e) on-time receipt of files scheduled to be delivered to the financial institution transfer station 110; (f) on-time receipt of files scheduled to be delivered to the shared ACH processing platform; (g) file throughput equivalency monitoring (i.e., assurance that the volume of files received by either the financial institution landing zone 120 or the shared ACH processing platform landing zone 150 is equivalent to the volume of files communicated out of the respective financial institution landing zone 120 or the shared ACH processing platform landing zone 150); (h) volume and/or duration of file control activities (i.e., queuing up files but not releasing files for subsequent processing due to problems at the transfer station 110 or within the internal infrastructure); (i) on-time initiation and/or completion of scheduled intraday events (also referred to as jobs or services), such as memo posts, end-of-day processing and the like; (j) performance of ACH processing related infrastructure, such as percentage use of CPU, throughput rate, memory available and the like and any other monitored activities/processes.

In accordance with specific embodiments, the triggering event 210 associated with an alarm 212 is meeting or exceeding a predetermined threshold associated with a monitored activity/process. For example, a time threshold may be defined for receipt of an acknowledgement from the shared ACH processing platform or generation of an acknowledgement to be communicated from the transfer station 110 to the shared ACH processing platform. In another example, a time threshold may be defined for receipt of scheduled files at the transfer station 110 or at the shared ACH processing platform. In a further example, a time threshold may be defined for the initiation or the completion of a scheduled intraday event, such as a memo post, end-of-day job/service or the like.

Likewise, in another embodiment, infrastructure performance thresholds may be defined, such as CPU capacity thresholds, throughput rate thresholds, memory usage thresholds or the like. The infrastructure performance thresholds may be predictive indicators of an impending alarm/exception, such as occurrence of a file control activity or the like.

In other embodiments, the triggering event 210 may be identification of one or more non-compliant ACH files at the transfer station 110 or at the shared ACH processing platform. In another example, the triggering event 210 may be a volume difference between the files received at a landing zone and the files communicated out of the same landing zone, an occurrence of a file control activity or the like.

FIG. 2 provides a more detailed block diagram of an ACH monitoring apparatus 200 and, more specifically, the ACH monitoring dashboard application 216, in accordance with embodiments of the present invention. As previously noted, the ACH monitoring apparatus 200 includes a computing platform 202 having at least one processor 204 and a memory 206. The memory 206 stores an ACH monitoring dashboard application 216 that is configured to provide computer network access, such as intranet access to results of ACH monitoring including access to alarm messages. The monitoring results include acknowledgement monitoring results 220, file compliance monitoring results 230, scheduled file monitoring results 240, file throughput equivalency monitoring 250, file control monitoring results 260, infrastructure monitoring results 270 and service delivery results 280. In addition, the ACH monitoring dashboard application 216 may provide for presentation of a file status research repository 290, a confidence index 296, other ACH monitoring performance index 298. The specific monitoring results shown in FIG. 2 are by way of example only and, as such, the ACH monitoring dashboard application 216 may be configured to provide for computer network access to more or less of the monitoring results than are depicted in FIG. 2.

The acknowledgement monitoring results 220 may include acknowledgement messages sent from the shared ACH processing platform 222 in response to file(s) sent from the financial institution transfer station or acknowledgement messages sent from the financial institution transfer station in response to file(s) sent from the shared ACH processing platform 224. Thus, if monitoring determines that an acknowledgement has not been received by the financial institution transfer station, based on the transfer station sending file(s) to the shared ACH processing platform, an exception results and an alarm message 226 is generated. In this regard, a time threshold may be defined that identifies a specific time period in which an acknowledgement message requires receipt by the financial institution transfer station. If the acknowledgement message is not received within the predefined time threshold, a corresponding alarm message 226 is generated and computer network access to the alarm message 226 is provided via a corresponding dashboard. For a specific example of such a dashboard please refer to FIG. 5 and the related discussion. Further, if monitoring determines that an acknowledgement has not been sent by the financial institution transfer station, based on the receipt of files sent form the ACH processing platform, an exception results and an alarm message 228 is generated. In this regard, a time threshold may be defined that identifies a specific time period in which an acknowledgement message requires communication by the financial institution transfer station. If the acknowledgement message is not sent within the predefined time threshold, a corresponding alarm message 228 is generated. Moreover, computer network access to the alarm message 228 is provided via a corresponding dashboard. For a specific example of such a dashboard please refer to FIG. 6 and the related discussion.

The file compliance monitoring results 230 may include financial institution transfer station file compliance monitoring 232 and shared ACH processing platform file compliance monitoring 234. Thus, if monitoring determines that a file received at the financial institution transfer station or at the shared ACH processing platform is non-compliant, which may include both fatal and non-fatal errors, an exception results and a corresponding alarm message 236 or 238 is generated. In addition, network access to the alarm message is provided via a corresponding dashboard. For a specific example of such a dashboard please refer to FIG. 7 and the related discussion.

The scheduled monitoring results 240 may include scheduled origination/client files 242 to be received at the financial institution transfer station and scheduled shared ACH processing platform files 244 to be received at the financial institution transfer station. Thus, if monitoring determines that a scheduled origination/client file(s) has not been received by the financial institution transfer station within the allotted time frame, an exception results and an alarm message 246 is generated. In this regard, a time threshold may be defined that identifies a specific time period in which a scheduled origination/client file(s) requires receipt by the financial institution transfer station. If the scheduled origination/client file(s) is not received within the predefined time threshold, a corresponding alarm message 246 is generated and computer network access to the alarm message 246 is provided via a corresponding dashboard. For a specific example of such a dashboard please refer to FIG. 8 and the related discussion. Further, if monitoring determines that a scheduled shared ACH processing platform file(s) has not been received by the financial institution transfer station within the allotted time frame, an exception results and an alarm message 248 is generated. In this regard, a time threshold may be defined that identifies a specific time period in which a scheduled shared ACH processing platform file(s) requires receipt by the financial institution transfer station. If the scheduled shared ACH processing platform is not received within the predefined time threshold, a corresponding alarm message 248 is generated. Additionally, computer network access to the alarm message 248 is provided via a corresponding dashboard. For a specific example of such a dashboard please refer to FIG. 11 and the related discussion.

The file throughput equivalency monitoring results 250 provide for monitoring the volume of files received at the financial institution landing zone or the shared ACH processing platform versus the volume of files sent from the institution landing zone or the shared ACH processing platform. This comparison insures that no files are lost or otherwise dropped at the landing zones and accounts for file failures other than non-compliance related errors/failures. Thus, if monitoring determines that the volume of files received at either the financial institution landing zone or the shared ACH processing platform landing zone is not equivalent in volume to the files being sent from the respective landing zone, an exception results and a corresponding alarm message 252 is generated. In addition, network access to the alarm message 252 is provided via a corresponding dashboard. For a specific example of such a dashboard please refer to FIG. 9 and the related discussion.

The file control monitoring results 260 provide for the occurrence and frequency of file control activities. As previously noted certain problems at the transfer station, such as infrastructure down time or the like, may trigger the need for a file control activity, which serves to hold files in queue until the problem resolved. Additionally, the financial institution transfer station may receive notification from the shared ACH processing platform that requires all files to be queued (i.e., a file control activity invoked) for subsequent delivery once the transfer station receives notification that the problems at the shared ACH processing platform have been resolved. Thus, if monitoring determines that a file control activity has been invoked, an exception results and a corresponding alarm message 262 is generated. Additionally, network access to the alarm message 262 is provided via a corresponding dashboard. For a specific example of such a dashboard please refer to FIG. 10 and the related discussion.

The infrastructure monitoring results 270 provide for infrastructure component performance monitoring, such as Central Processing Unit (CPU) available capacity or usage, throughput rate, memory available capacity or usage and the like. A threshold value may be defined for each infrastructure component and/or performance metric. The threshold value may be defined based the ability to predict correlation between the infrastructure component performance and other exceptions, such as file control exceptions, file throughput equivalency exceptions and the like. In this regard, if a determination is made that the threshold is met or exceeded, an exception results and a corresponding alarm message 272 is generated. Additionally, network access to the alarm message 272 is provided via a corresponding dashboard. For a specific example of such a dashboard please refer to FIG. 13 and the related discussion.

The service delivery monitoring results 280 provide for tracking end-of-day or intraday events associated with ACH processing, such as memo posts and the like, that occur at the financial institution transfer station or at the shared ACH processing platform. The tracking may include tracking the start time of the service delivery events and the completion time of the service delivery events. The determined start time and/or completion time is compared to predefined start times and/or completion times to insure that service delivery events occur as planned and are conducted in a time efficient manner. If a determination is made that the start time for a service delivery event fails to meet or exceeds a predetermined start time threshold or a determination is made that the completion time for a service delivery event fails to meet or exceed a predetermined completion time and/or an allotted time period, an exception results and a corresponding alarm message 282 is generated. Additionally, network access to the alarm message 282 is provided via a corresponding dashboard. For a specific example of such a dashboard, please refer to FIG. 12 and the related discussion.

Additionally, the ACH monitoring dashboard application 216 may provide for file status research repository 290. The repository includes a search engine 292 configured to locate and present the status of an ACH file based on predetermined and identifiable search criteria 294. A specific example of such a file status research repository is illustrated in FIG. 15 and the related discussion.

In addition, the ACH monitoring dashboard 216 may provide for a confidence index 296 that may be readily displayed in conjunction with one or more of the dashboards. The confidence index provides for quantifying the overall health of the financial institution transfer station and related data sources. An example of a confidence index is illustrated in FIGS. 5-13.

Additionally, the ACH monitoring dashboard application 216 may provide for presentation of other performance metrics 296. The other performance metrics may be provided in conjunction with other dashboards, such as the dashboards described above, or the performance metrics may be provided for in one or more stand-alone dashboards. In one embodiment of the invention, performance metrics may be displayed and a selection of a performance metric may result in presentation of a graph that further highlights the performance of the selected performance metric. A specific example of such as dashboard is shown and described in relation to FIG. 14.

Referring to FIG. 3, a flow diagram is depicted of a method for managing Automated Clearing House (ACH) processing, in accordance with an embodiment of the present invention. At Event 310, a plurality of ACH activities/processes are monitored on an on-going basis. In accordance with specific embodiments of the invention, monitoring may include, but is not limited to, monitoring receipt of acknowledgement messages from a shared ACH processing platform; monitoring communication of acknowledgement messages to a shared ACH processing platform; monitoring compliance of files received by a financial institution transfer station; monitoring compliance of files received by a shared ACH processing platform; monitoring receipt of scheduled origination/client files sent from internal sources or files sent from the shared ACH processing platform; monitoring the volume of files received at landing zone of a transfer station versus files communicated from the landing zone; monitoring occurrence and frequency of file control activities; monitoring initiation and completion of re-occurring events; and monitoring infrastructure performance associated with ACH processing activities.

At Event 320, one or more events associated with a respective monitored ACH process are determined. The one or more events trigger a respective exception/alarm. In the instance in which the monitoring event includes monitoring receipt/communication of acknowledgement messages, the event that triggers the alarm/exception is the failure to receive or communicate the acknowledgement message within a predetermined time threshold. In the instance in which the monitored event includes monitoring compliance of files received at the financial institution transfer station or shared ACH processing platform, the event that triggers the alarm/exception is identification of a fatal or non-fatal non-compliant file. Further, in those embodiments in which the monitoring event includes monitoring receipt of scheduled origination files sent from internal sources or scheduled files for the shared ACH processing platform, the event that triggers the alarm/exception is the failure to receive the scheduled files within a predetermined time threshold.

In other embodiments in which the monitoring event includes monitoring the volume of files received at landing zone of a transfer station versus files communicated from the landing zone, the event that triggers the alarm/exception is identification of a non-equivalency between files in and files out at a landing zone within the transfer station. In still further embodiments in which the monitoring event includes monitoring occurrence and duration of file control activities, the event that triggers the alarm/exception is occurrence of a file control activity, occurrence of a predetermined volume of file control activities over a predetermined time period and/or duration of a file control activity beyond a predetermined time threshold. In still further embodiments in which the monitoring event includes monitoring initiation and completion of re-occurring end-of-day or intraday events, such as memo posts and the like, the event that triggers the alarm/exception is failure to initiate or complete the re-occurring event with a predetermined time threshold. Moreover, in other embodiments in which the monitoring event monitoring performance of infrastructure, the event that triggers the alarm/exception is performance of an infrastructure metric, such as CPU capacity, throughput rate, storage capacity/availability above/below a predetermined threshold. In such embodiments, the infrastructure performance thresholds may be set based on predictive correlations between the performance of the infrastructure and performance of the ACH processing activities.

At Event 330, one or more alarm messages are generated based on occurrence the alarm/exception-triggering event. The alarm message includes various information pertaining to the exception/alarm such as, but not limited to, file(s) name, file identification number, file classification, date/time file received, date/time file sent, file source, credit items/amount in file(s), debit items/amount in files, exception code, file schedule identification number, resend number, elapsed time, date/time file control invoked, total files in file control; release time for files in file control, countdown volume for files in file control queue, scheduled start time for service delivery event, deviation from start time for service delivery event, scheduled completion time for service delivery event, deviation from completion time for service delivery events and the like.

At Event 340, computer network access, such as via an intranet or the like, are provided to the results of the monitoring including access to the alarm messages. In addition to provide computer network access to the alarm messages, the alarm messages may be communicated to one or more predetermined employees or groups of employees via any electronic means, such as electronic mail (i.e., email), short message service (i.e., text message), prerecorded voice mail or the like. The results of the monitoring can be provided in real-time, such that alarm messages that are provided via the computer network represent active exceptions/alarms that can be identified by an associate through the network access and requisite actions taken to resolve the issues surrounding the exception/alarm. In one embodiment of the invention, the monitoring results, including the alarm messages are presented via a dashboard application. Examples of specific ACH monitoring dashboards are shown and described in relation to FIGS. 5-15, infra.

Turning the reader's attention to FIG. 4 shown is a block diagram of exemplary presentation zones 400 in an ACH monitoring dashboard application, in accordance with embodiments of the present invention. The exemplary presentation zone layout provides for a user to readily access information related to monitoring and, specifically, simplified access to monitoring metrics, monitoring activities and alarm messages related to a specified monitored activity. In accordance with specific embodiments presentation zone one 410 is located in the upper left-hand corner of the overall presentation area and may include a navigation panel. The navigation panel, as shown and described in FIGS. 5-14 includes a plurality of monitoring activity identifiers, such as a name or the like and an alarm message indicator that indicates whether exceptions/alarms are currently active in the activity or whether a minimal threshold of exceptions/alarms are currently active in the activity. In addition, the monitoring activity identifiers and/or alarm message indicators may be activated, such as through a user interface device keystroke or mouse action, to display the associated monitoring category results, including the alarm messages, in presentation zone three 430. Thus, the navigation panel displayed in presentation zone one remains consistent in all the dashboards, while the alarm message indicator associated with the monitoring activities will change based on the state of active exceptions/alarms.

Presentation zone two 420 is located in the lower left-hand corner of the presentation area and may include overall ACH processing statistics/metrics. The ACH processing statistics may reflect previous end-of-day statistics/metrics or current intraday statistics/metrics. The current intraday statistics/metrics are considered to be real-time data based on the near real-time data updates provided by the financial institution transfer station storage to the monitoring apparatus. In addition, presentation zone two 420 may be configured as a scrollable area to accommodate presentation of additional ACH processing statistics/metrics that may not be viewable if the presentation zone was not scrollable. As an alternative to providing for presentation zone two 420 as a scrollable area, zone two 420 may be configured with multiple pages displayable through user activation of a page icon.

As previously noted, presentation zone three 430 will provide display of monitoring results, including alarm messages related to specific monitoring activity. The specific monitoring activity shown in presentation zone three 430 may be dictated based on user selection of a monitoring activity via the navigation panel shown in presentation zone one 410. Presentation zone three 430 may include alarm message icons that may be activated, such as through a user interface device keystroke or mouse action, to display the associated contents of the alarm message. In addition, presentation zone three 430 may be configured as a scrollable area to accommodate presentation of additional alarm messages or, alternatively, presentation zone three 430 may be configured with multiple pages displayable through user activation of a page icon.

As noted FIGS. 5-15 provide for graphical representations of various exemplary ACH monitoring dashboards implemented in conjunction with the ACH monitoring activities herein disclosed. The exemplary ACH monitoring dashboards shown illustrate one specific example of how the monitoring results including the alarm messages may be presented to a user via computer network access, Thus, the exemplary ACH monitoring dashboards shown and described should be considered as limiting; more, fewer or other completely different ACH monitoring dashboards can be implemented without departing from the inventive concepts herein disclosed.

FIG. 5 provides an example of an ACH monitoring dashboard 500 configured to present monitoring results related to acknowledgement messages received at the financial institution transfer station, in accordance with embodiments of the present invention. Presentation zone one 502 includes a navigation panel, presentation zone two 504 includes ACH activity/process performance statistics/metrics and presentation zone three 506 includes the monitoring results related to acknowledgement messages received at the financial institution transfer station, such as the alarm messages related to failure to receive an acknowledgement message at the transfer station.

The navigation panel of presentation zone one 503 includes a plurality of monitoring activity identifiers, which in the illustrated embodiment are the name or an abbreviated name of the related monitoring activity. For example, the monitoring activity identifiers include, but are not necessarily limited to, "files to", "files from", "bank compliance", "shared ACH platform compliance", "bank incoming", "shared ACH platform scheduled", "bank outgoing", "bank file control", "service delivery", "infrastructure" and the like. Additionally, numerous monitoring activity identifiers have an associated alarm message indicator. In the illustrated example, the alarm message indicator is in the form of a color-changing visual that may indicate a first color, such as green, in the event that no alarms/exceptions currently exist for the associated monitoring activity or that a minimal threshold of alarm/exceptions currently do not exist for the associated monitored activity. Conversely, the color-changing visual may indicate a second color, such as red, in the event that alarms/exceptions currently do exist for the associated monitored activity or that a minimal threshold of alarms/exceptions exist for the associated category.

For example, the "files to" monitoring activity identifier is associated with alarm message indicator 508 which indicates whether alarms/exceptions or a minimal threshold of alarms exceptions currently exist in the "files to" monitoring activity. The "files to" monitoring activity provides for monitoring receipt at the transfer station of an acknowledgement message to insure receipt of files sent from the transfer station to a shared ACH processing platform. The "files from" monitoring activity identifier is associated with message indicator 510 which indicates whether alarms/exceptions or a minimal threshold of alarms exceptions currently exist in the "files from" monitoring activity. The "files from" monitoring activity provides for monitoring that the transfer station has sent an acknowledgement message to the shared ACH processing platform in response to receipt at the transfer station of file(s) sent from the shared ACH processing platform.

The "bank/financial institution compliance" monitoring activity identifier is associated with alarm message indicator 512 which indicates whether alarms/exceptions or a minimal threshold of alarms exceptions currently exist in the "bank/financial institution compliance" monitoring activity. The "bank/financial institution compliance" monitoring activity provides for monitoring compliance of origination/client files received at the financial institution transfer station from internal sources. The "shared ACH platform compliance" monitoring activity identifier is associated with alarm message indicator 514 which indicates whether alarms/exceptions or a minimal threshold of alarms exceptions currently exist in the "shared ACH platform compliance" monitoring activity. The "shared ACH platform compliance" monitoring activity provides for monitoring compliance of origination/client files received at the financial institution transfer station from internal sources.

The "bank/financial institution incoming" monitoring activity identifier is associated with alarm message indicator 516 which indicates whether alarms/exceptions or a minimal threshold of alarms exceptions currently exist in the "bank/financial institution incoming" monitoring activity. The "bank/financial institution incoming" monitoring activity provides for monitoring on-time receipt of re-occurring scheduled origination/client files sent from internal source. The "shared ACH platform scheduled" monitoring activity identifier is associated with alarm message indicator 518 which indicates whether alarms/exceptions or a minimal threshold of alarms exceptions currently exist in the "shared ACH platform scheduled" monitoring activity. The "shared ACH platform scheduled" monitoring activity provides for monitoring on-time receipt of re-occurring scheduled files sent from the shared ACH processing platform.

The "bank/financial institution outgoing" monitoring activity identifier is associated with alarm message indicator 530 which indicates whether alarms/exceptions or a minimal threshold of alarms exceptions currently exist in the "bank/financial institution outgoing" monitoring activity. The "bank/financial institution outgoing" monitoring activity provides for monitoring the volume of files received at a transfer station landing zone in relation to the volume of files sent from the transfer station landing zone to insure that files were not dropped or otherwise failed to process.

The "bank/financial file control" monitoring activity identifier is associated with alarm message indicator 532 which indicates whether alarms/exceptions or a minimal threshold of alarms exceptions currently exist in the "bank/financial institution file control" monitoring activity. The "bank/financial institution file control" monitoring activity provides for monitoring the occurrence, duration and/or frequency of file control activities, which hold files in queue at the transfer station or at shared ACH processing platform based on processing issues at the transfer station or at the shared ACH processing platform.

The "service delivery" monitoring activity identifier is associated with alarm message indicator 524 which indicates whether alarms/exceptions or a minimal threshold of alarms exceptions currently exist in the "service delivery" monitoring activity. The "service delivery" monitoring activity provides for monitoring on-time initiation, duration and on-time completion of re-occurring end-of-day or intraday processing events, such as memo posts or the like, which may occur at the transfer station or at the shared ACH processing platform. The "infrastructure" monitoring activity identifier is associated with alarm message indicator 526 which indicates whether alarms/exceptions or a minimal threshold of alarms exceptions currently exist in the "infrastructure" monitoring activity. The "infrastructure" monitoring activity provides for monitoring performance of infrastructure components, such as CPU capacity, throughput rate, memory capacity/usage and the like, at the transfer station or at the shared ACH processing platform. It should be noted that in the illustrated example the alarm message indicator for the "service delivery" and "infrastructure" monitoring activity identifier is a bar-like icon that changes color to indicate change in the alarm/exception status.

The "edit" monitoring activity is associated with alarm message indicator 528 which indicates whether alarms/exceptions or a minimal threshold of alarm exceptions currently exist in the "edit" monitoring activity. The "edit" monitoring activity provides for monitoring, at the shared ACH processing platform, of file exceptions that are noted during risk specific item level edits and, more specifically, file exceptions that would cause the file to not be forwarded to the file entry process. The "entry" monitoring activity is associated with alarm message indicator 530 which indicates whether alarms/exceptions or a minimal threshold of alarm exceptions currently exist in the "entry" monitoring activity. The "entry" monitoring activity provides for monitoring entry process exceptions at the shared ACH processing platform. Entry processing provides for assignment of trace numbers and distribution dates. In addition, transaction code validations, routing number validations and amount validations are performed during entry processing. Subsequently, file items are loaded to the warehouse and staged for downstream batch distributions. It should be noted that in specific embodiments of the invention, "edit" monitoring and/or "entry" monitoring may be optional configurations.

In addition to providing the alarm/exception status for each of the ACH monitored activities, the navigation panel also may serve as the gateway to presentation of monitoring results in presentation zone three 506. Thus, the monitored activity identifiers and/or the associated alarm message indicators 508-526 may be user activated, such as through a designated keystroke or mouse action, to provide for presentation, in presentation zone three, of the monitoring results associated with the monitored activity. For example, in the illustrated example of FIG. 5 the "files to" arrow or the associated alarm message indicator 508 has been user-activated to result in the presentation of "files to" monitoring results in presentation zone three 506. In further FIGS. 6-14, a user has activated other monitored activity identifiers or the associated alarm message indicator to provide for presentation of other monitored activity results in presentation zone three.

Presentation zone two 504 includes ACH processing statistics/metrics. The processing statistics/metrics presented in presentation zone two 504 may include, but are not limited to, total files sent in the day; volume and/or percentage of files sent on time; volume and/or percentage of files sent late; volume and/or percentage of files to be sent that are overdue; volume and/or dollar amount of compliance exceptions; volume of files requiring a re-send; volume and/or percentage of files sent acknowledged on-time; volume and/or percentage of files sent acknowledged late; volume and/or percentage of files sent with a currently overdue acknowledgement; average cycle time; total files received; volume and/or percentage of scheduled files received on-time; volume and/or percentage of scheduled filed received late; volume and/or percentage of scheduled files currently overdue; volume and/or percentage of files received acknowledged on-time; volume and/or percentage of files received acknowledged late; volume and/or percentage of files received with a currently overdue acknowledgement and the like. The processing statistics/metrics may be configured to provided for real-time or near real-time ACH processing performance statistics/metrics or, in other embodiments, the processing statistics/metrics may be configured to provide for the historical ACH processing performance statistics/metrics, such as previous day statistics/metrics or the system may be configured for a user to choose between presentation of the current real-time performance statistics/metrics and historical performance statistics/metrics.

In addition, the performance statistics/metrics provide for a performance indicator icon 505 that indicates how the performance statistic is trending compared to historical data. In the illustrated example, a sun-like icon is used to indicate that a particular performance statistic/metric is trending above a certain historical data threshold and a cloud-like icon (not shown in FIG. 5) may be used to indicate that a particular performance statistic/metric is trending below a certain historical data threshold.

Presentation zone three 506 includes monitoring results for "files to" monitoring activity which monitors receipt at the transfer station of an acknowledgement message to insure receipt of files sent from the transfer station to a shared ACH processing platform. If an acknowledgement message is not received at the financial institution transfer station within a predetermined time period/threshold, an exception/alarm results and an alarm message is generated. The alarm icon 540 indicates that an alarm/exception currently exists for the "files to" monitoring activity shown in presentation zone three 506. If multiple alarms/exceptions currently exist for the "files to" monitoring activity, the dashboard may be configured to provide for display of multiple alarm icons 540, each alarm icon representing an associated alarm/exception. The alarm icon 540 is configured to be user-activated, such as via a designated keystroke or mouse action, to provide for display of the associated alarm messages associated with the alarm/exception. In the illustrated example of FIG. 5, the alarm icon 540 has been activated to show alarm messages 550.

Presentation zone three 506 additionally provides for display of confidence index indicator 560 that indicates the overall health of data sources to insure the integrity of the ACH monitoring system. In the illustrated example the confidence index indicator 560 comprises a series of color-changing visuals, such that the more visuals that display a specific color, such as green, indicate a more confident monitoring system, while the more visuals that display another specific color, such as red, indicate a less confident monitoring system. In other embodiments of the invention, the confidence index indicator 560 may provide for presentation of a confidence score, grade or the like, in lieu of or in addition to the visual indicator shown.

The exceptions button 570 provides for a user activated interface that upon user activation, such as engaging a designated keypad or mouse action, presents an active list of currently outstanding (i.e., overdue) exceptions. For example in the illustrated example of FIG. 5 in which "files to" is the monitored activity, the currently outstanding exceptions/alarms would be associated with files sent that have yet to receive an acknowledgement (i.e., the acknowledgement is currently outstanding). The corresponding all button 580 provides for a user activated interface that upon user activation, such as engaging a designated keypad or mouse action, presents an complete list of all exceptions for a given period of time, such as the current business day or the like. For example in the illustrated example of FIG. 5 in which "files to" is the monitored activity the all exceptions/alarms would be include exceptions/alarms associated with files sent that have yet to receive an acknowledgement (i.e., the acknowledgement is currently outstanding) and exceptions/alarms that have expired due to overdue acknowledgement having been received late.

The data element bar 590 includes data elements associated with the monitored activity shown in presentation zone three 506. The one or more of the data elements will characteristically be included in the alarm message for the purpose of providing the user requisite information to address the issue surrounding the exception/alarm. In the illustrated embodiment of FIG. 5 the data elements may include, but are not limited to, date/time of file receipt, resend number, file source, file serial number, file name, file identification, logical file number, date/file was sent, credit items and amount in file, debit items and amount in file, date and time or acknowledgement transmission, elapsed time since file sent and the like.

FIG. 6 provides an example of an ACH monitoring dashboard 600 configured to present monitoring results related to acknowledgement messages sent from the financial institution transfer station, in accordance with embodiments of the present invention.

Presentation zone one 602 includes the navigation panel shown and described in relation to FIG. 5. Elements 608-630 of FIG. 6 are equivalent to elements 508-530 of FIG. 5 and, therefore, for the sake of brevity, the discussion related to these elements is not repeated in the discussion FIG. 6. In the illustrated example of FIG. 6 the "files from" arrow or the associated alarm message indicator 610 has been user-activated to result in the presentation of "files from" monitoring results in presentation zone three 606.

Presentation zone two 604 includes the same ACH processing statistics/metrics shown and described in relating to presentation zone two 504 of FIG. 5. For the sake of brevity, the discussion related to the ACH processing performance statistics/metrics is not repeated in the discussion of FIG. 6.

Presentation zone three 606 includes monitoring results for a "files from" monitoring activity which monitors acknowledgement messages sent from the financial institution transfer station in response to receipt of files from the shared ACH processing platform to insure receipt of files sent from the shared ACH processing platform to the financial institution transfer station. If an acknowledgement message is not sent from the financial institution transfer station within a predetermined time period/threshold, an exception/alarm results and an alarm message is generated. The alarm icon 640 indicates that an alarm/exception currently exists for the "files from" monitoring activity shown in presentation zone three 606. If multiple alarms/exceptions currently exist for the "files from" monitoring activity, the dashboard may be configured to provide for display of multiple alarm icons 640, each alarm icon representing an associated alarm/exception. In the illustrated example of FIG. 6, the alarm icon 640 has been activated to show alarm messages 650.

Similar to the presentation zone three 506 of FIG. 5, the presentation zone three 606 of FIG. 6 provides for display of confidence index indicator 660, exceptions button 670 and all button 680. In the illustrated example of FIG. 6 in which "files from" is the monitored activity, activating exception button 670 will provide for presentation of the currently outstanding exceptions/alarms associated with files received from the shared ACH platform however an acknowledgement has yet to sent by the transfer station (i.e., the acknowledgement is currently outstanding). Additionally, in the illustrated example of FIG. 6 in which "files from" is the monitored activity the all exceptions/alarms would include exceptions/alarms associated with files received that have yet to transmit a corresponding acknowledgement (i.e., the acknowledgement is currently outstanding) and exceptions/alarms that have expired due to overdue acknowledgement having been sent late.

Further, in the illustrated embodiment of FIG. 6 the data element bar 690 includes but is not limited to, data elements representing, date/time of file receipt, file serial number, file name, credit items and amount in file, debit items and amount in file, date and time or acknowledgement transmission, elapsed time since file sent and the like.

FIG. 7 provides an example of an ACH monitoring dashboard 700 configured to present monitoring results related to compliance of origination/client files received at the financial institution transfer station and compliance of files received from the shared ACH processing platform, in accordance with embodiments of the present invention.

Presentation zone one 702 includes the navigation panel shown and described in relation to FIG. 5. Elements 708-730 of FIG. 7 are equivalent to elements 508-530 of FIG. 5 and, therefore, for the sake of brevity, the discussion related to these elements is not repeated in the discussion FIG. 7. In the illustrated example of FIG. 7 the "bank/financial institution compliance" monitoring activity identifier or the associated alarm message indicator 712 has been user-activated to result in the presentation of "compliance" monitoring results in presentation zone three 706.

Presentation zone two 704 includes the same ACH processing statistics/metrics shown and described in relating to presentation zone two 504 of FIG. 5. For the sake of brevity, the discussion related to the ACH processing performance statistics/metrics is not repeated in the discussion of FIG. 7.

Presentation zone three 706 includes monitoring results for a "compliance" monitoring activity which monitors the fatal or non-fatal error compliance of origination/client files of shared ACH processing files received at the transfer station. If a file is determined to be non-compliant, an exception/alarm results and an alarm message is generated. The alarm icon 740 indicates that an alarm/exception currently exists for the "compliance" monitoring activity shown in presentation zone three 706. In the illustrated example of FIG. 7, the alarm icon 740 has been activated to show alarm messages 750.

Similar to the presentation zone three 506 of FIG. 5, the presentation zone three 706 of FIG. 7 provides for display of confidence index indicator 760, exceptions button 770 and all button 780. In the illustrated example of FIG. 7 in which "compliance" is the monitored activity, activating exception button 770 will provide for presentation of the currently outstanding exceptions/alarms associated with currently non-compliant files. Additionally, in the illustrated example of FIG. 7 in which "compliance" is the monitored activity the all exceptions/alarms would include exceptions/alarms associated with currently non-compliant files and exceptions/alarms associated with previously non-compliant files (i.e., files in which the non-compliant issue has been addressed and resolved).

Further, in the illustrated embodiment of FIG. 7 the data element bar 790 includes but is not limited to, data elements representing, date/time of file receipt, resend number, file source, file serial number, file type, file name, file identifier, exception code, credit items and amount in file, debit items and amount in file and the like.

FIG. 8 provides an example of an ACH monitoring dashboard 800 configured to present monitoring results related to on-time receipt of scheduled origination/client files, in accordance with embodiments of the present invention.

Presentation zone one 802 includes the navigation panel shown and described in relation to FIG. 5. Elements 808-830 of FIG. 8 are equivalent to elements 508-530 of FIG. 5 and, therefore, for the sake of brevity, the discussion related to these elements is not repeated in the discussion FIG. 8. In the illustrated example of FIG. 8 the "incoming" monitoring activity identifier or the associated alarm message indicator 816 has been user-activated to result in the presentation of "incoming" monitoring results in presentation zone three 806.

Presentation zone two 804 includes the same ACH processing statistics/metrics shown and described in relating to presentation zone two 504 of FIG. 5. For the sake of brevity, the discussion related to the ACH processing performance statistics/metrics is not repeated in the discussion of FIG. 8.

Presentation zone three 806 includes monitoring results for an "incoming" monitoring activity which monitors the on-time delivery of scheduled origination/client files. If a file is determined to not be delivered within by a specific predetermined time or within a specific predetermined time period, an exception/alarm results and an alarm message is generated. The alarm icon 840 indicates that an alarm/exception currently exists for the "incoming" monitoring activity shown in presentation zone three 806. In the illustrated example of FIG. 8, the alarm icon 840 has been activated to show alarm messages 850.

Similar to the presentation zone three 506 of FIG. 5, the presentation zone three 806 of FIG. 8 provides for display of confidence index indicator 860, exceptions button 870 and all button 880. In the illustrated example of FIG. 8 in which "incoming" is the monitored activity, activating exception button 870 will provide for presentation of the currently outstanding exceptions/alarms associated with currently scheduled files not yet received. Additionally, in the illustrated example of FIG. 8 in which "incoming" is the monitored activity the all exceptions/alarms would include exceptions/alarms associated with scheduled origination/client files not yet received and exceptions/alarms associated with scheduled origination/client files that were received beyond the predetermined scheduled time or the predetermined time period.

Further, in the illustrated embodiment of FIG. 8 the data element bar 890 includes but is not limited to, data elements representing, current date, file source, file type, file schedule identifier, expected delivery time, elapsed time and, once received, the date/time of receipt and the like.

FIG. 9 provides an example of an ACH monitoring dashboard 900 configured to present monitoring results related to file throughput equivalency at landing zones within the transfer station, in accordance with specific embodiments of the invention.

Presentation zone one 902 includes the navigation panel shown and described in relation to FIG. 5. Elements 908-930 of FIG. 9 are equivalent to elements 508-530 of FIG. 5 and, therefore, for the sake of brevity, the discussion related to these elements is not repeated in the discussion FIG. 9. In the illustrated example of FIG. 9 the "outgoing" monitoring activity identifier or the associated alarm message indicator 920 has been user-activated to result in the presentation of "outgoing" monitoring results in presentation zone three 906.

Presentation zone two 904 includes the same ACH processing statistics/metrics shown and described in relating to presentation zone two 504 of FIG. 5. For the sake of brevity, the discussion related to the ACH processing performance statistics/metrics is not repeated in the discussion of FIG. 9.

Presentation zone three 906 includes monitoring results for a "outgoing" monitoring activity which monitors the volume of files received at a landing zone within the transfer station as compared to the volume of files sent from the same landing zone to insure that files in are equivalent to the files out. If a determination is made that the files in are not equivalent to the files out over a predetermined time period, an exception/alarm results and an alarm message is generated. The alarm icon 940 indicates that an alarm/exception currently exists for the "outgoing" monitoring activity shown in presentation zone three 906. In the illustrated example of FIG. 9, the alarm icon 940 has been activated to show alarm messages 950.

Similar to the presentation zone three 506 of FIG. 5, the presentation zone three 906 of FIG. 9 provides for display of confidence index indicator 960, exceptions button 970 and all button 980. In the illustrated example of FIG. 9 in which "outgoing" is the monitored activity, activating exception button 970 will provide for presentation of the currently outstanding exceptions/alarms associated with landing zone file volume inequalities. Additionally, in the illustrated example of FIG. 9 in which "outgoing" is the monitored activity the all exceptions/alarms would include exceptions/alarms associated with current landing zone file volume inequalities and exceptions/alarms associated with previously landing zone volume inequalities that have subsequently been resolved.

Further, in the illustrated embodiment of FIG. 9 the data element bar 990 includes, but is not limited to, data elements representing, date/time of file receipt, resend number, file source, file classification, file serial number, file name, file identifier, logical file number, credit items and amount in file, debit items and amount in file, elapsed time and data/time that the file was sent and the like.

FIG. 10 provides an example of an ACH monitoring dashboard 1000 configured to present monitoring results related to occurrence, duration and/or frequency of file control activities, which queue files for subsequent delivery in the event of processing issues within the transfer station or the shared ACH processing platform, in accordance with embodiments of the present invention.

Presentation zone one 1002 includes the navigation panel shown and described in relation to FIG. 5. Elements 1008-1030 of FIG. 10 are equivalent to elements 508-530 of FIG. 5 and, therefore, for the sake of brevity, the discussion related to these elements is not repeated in the discussion FIG. 10. In the illustrated example of FIG. 10 the "file control" monitoring activity identifier or the associated alarm message indicator 1022 has been user-activated to result in the presentation of "file control" monitoring results in presentation zone three 1006.

Presentation zone two 1004 includes the same ACH processing statistics/metrics shown and described in relating to presentation zone two 504 of FIG. 5. For the sake of brevity, the discussion related to the ACH processing performance statistics/metrics is not repeated in the discussion of FIG. 10.

Presentation zone three 1006 includes monitoring results for a "file control" monitoring activity which monitors the occurrence frequency and/or duration of file control activities. If a file control activity occurs or file control activities meet a predetermined frequency threshold or duration threshold, an exception/alarm results and an alarm message is generated. The alarm icons 1040 indicate that an alarm/exception currently exists for the "file control" monitoring activity shown in presentation zone three 1006. In the illustrated example of FIG. 10, the alarm icons 1040 have been activated to show alarm messages 1050.

Similar to the presentation zone three 506 of FIG. 5, the presentation zone three 1006 of FIG. 10 provides for display of confidence index indicator 1060, exceptions button 1070 and all button 1080. In the illustrated example of FIG. 10 in which "file control" is the monitored activity, activating exception button 1070 will provide for presentation of the currently implemented file control activities, current file control activities that exceed a predetermined frequency threshold or current file control activities that exceed a predetermined duration threshold. Additionally, in the illustrated example of FIG. 10 in which "file control" is the monitored activity the all exceptions/alarms would include exceptions/alarms associated with currently implemented file control activities, current file control activities that exceed a predetermined frequency threshold or current file control activities that exceed a predetermined duration threshold and previous implemented file control activities, previous file control activities that exceeded a predetermined frequency threshold or previous file control activities that exceeded a predetermined duration threshold.

Further, in the illustrated embodiment of FIG. 10 the data element bar 1090 includes but is not limited to, data elements representing, date/time file control activity was invoked, file processor identifier, total files queued, volume and total amount of credit items, volume and total amount of debit items, elapsed time of the file control activity, a countdown volume and the like. The countdown volume reflects the number of files remaining to be sent after the processing issue has been resolved, communication pipes have been opened and files are authorized to be sent from the queue.

FIG. 11 provides an example of an ACH monitoring dashboard 800 configured to present monitoring results related to on-time receipt of scheduled files sent from the shared ACH processing platform to the financial institution transfer station, in accordance with embodiments of the present invention.

Presentation zone one 1102 includes the navigation panel shown and described in relation to FIG. 5. Elements 1108-1130 of FIG. 11 are equivalent to elements 508-530 of FIG. 5 and, therefore, for the sake of brevity, the discussion related to these elements is not repeated in the discussion FIG. 11. In the illustrated example of FIG. 11 the "scheduled" monitoring activity identifier or the associated alarm message indicator 1118 has been user-activated to result in the presentation of "scheduled" monitoring results in presentation zone three 1106.

Presentation zone two 1104 includes the same ACH processing statistics/metrics shown and described in relating to presentation zone two 504 of FIG. 5. For the sake of brevity, the discussion related to the ACH processing performance statistics/metrics is not repeated in the discussion of FIG. 11.

Presentation zone three 1106 includes monitoring results for a "scheduled" monitoring activity which monitors the on-time delivery of scheduled shared ACH processing platform files. If a file is determined to not be delivered within by a specific predetermined time or within a specific predetermined time period, an exception/alarm results and an alarm message is generated. The alarm icon 1140 indicates that an alarm/exception currently exists for the "scheduled" monitoring activity shown in presentation zone three 1106. In the illustrated example of FIG. 11, the alarm icon 1140 has been activated to show alarm messages 1150.

Similar to the presentation zone three 506 of FIG. 5, the presentation zone three 1106 of FIG. 11 provides for display of confidence index indicator 1160, exceptions button 1170 and all button 1180. In the illustrated example of FIG. 11 in which "scheduled" is the monitored activity, activating exception button 1170 will provide for presentation of the currently outstanding exceptions/alarms associated with currently shared ACH processing platform scheduled files not yet received. Additionally, in the illustrated example of FIG. 11 in which "scheduled" is the monitored activity the all exceptions/alarms would include exceptions/alarms associated with scheduled shared ACH processing files not yet received and exceptions/alarms associated with scheduled shared ACH processing files that were received beyond the predetermined scheduled time or the predetermined time period.

Further, in the illustrated embodiment of FIG. 11 the data element bar 1190 includes but is not limited to, data elements representing, current date, file source, file type, file schedule identifier, expected delivery time, elapsed time and, once received, the date/time of receipt and the like.

FIG. 12 provides an example of an ACH monitoring dashboard 800 configured to present monitoring results related to re-occurring intraday or end-of-day processing events, in accordance with embodiments of the present invention.

Presentation zone one 1202 includes the navigation panel shown and described in relation to FIG. 5. Elements 1208-1230 of FIG. 12 are equivalent to elements 508-530 of FIG. 5 and, therefore, for the sake of brevity, the discussion related to these elements is not repeated in the discussion FIG. 12. In the illustrated example of FIG. 12 the "service delivery" monitoring activity identifier or the associated alarm message indicator 1224 has been user-activated to result in the presentation of "service delivery" monitoring results in presentation zone three 1206.

Presentation zone two 1204 includes the same ACH processing statistics/metrics shown and described in relating to presentation zone two 504 of FIG. 5. For the sake of brevity, the discussion related to the ACH processing performance statistics/metrics is not repeated in the discussion of FIG. 12.

Presentation zone three 1206 includes monitoring results for a "service delivery" monitoring activity which monitors the on-time initiation and completion of re-occurring intraday or end-of-day processing activities/events. If an event is determined not to have been initiated within a predetermined time period or completed within a predetermined time period, an exception/alarm results and an alarm message is generated. In the illustrated embodiment of FIG. 12, presentation zone three 1206 includes a plurality of service delivery job identifiers, such as transfer station memo post one 1240, transfer station memo post two 1242, transfer station end-of day 1244, shared ACH processing platform end-of day (eastern time) 1246, shared ACH processing platform end-of-day (central time) 1248, shared ACH processing platform end-of-day (pacific time) or the like. The service delivery job identifiers include an alarm message indicator, which provides a visual indication of whether an alarm is currently associated with the related service delivery job. For example, if an alarm/ exception currently exists for the related service delivery job, the alarm message indictor may be configured to change color to indicate presence of an alarm/exception. The user may activate the service delivery job identifier and/or the alarm message indicator, via a designated keypad or mouse action, to provide for display of the associated alarm message in presentation zone three 1206. In addition, presentation zone three 1206 provides for a listing of service job monitoring information, such as the job name, scheduled start time, deviation from start time, scheduled completion, deviation from completion time or the like. As shown, the service job monitoring information is located proximate to the corresponding service delivery job identifier.

Similar to the presentation zone three 506 of FIG. 5, the presentation zone three 1206 of FIG. 12 provides for display of confidence index indicator 1260, exceptions button 1270 and all button 1280. In the illustrated example of FIG. 12 in which "service delivery" is the monitored activity, activating exception button 1270 will provide for presentation of the currently outstanding exceptions/alarms associated with current processing events yet to be initiated within their predetermined time period or yet to be completed within their predetermined time period. Additionally, in the illustrated example of FIG. 12 in which "service delivery" is the monitored activity the all exceptions/alarms would include current processing events yet to be initiated within their predetermined time period or yet to be completed within their predetermined time period and previous processing events that were initiated past their predetermined time period or completed past their predetermined time period.

FIG. 13 provides an example of an ACH monitoring dashboard 1300 configured to present monitoring results related to infrastructure components associated with transfer station, an accordance with specific examples of the invention By providing for monitoring of infrastructure performance and defining infrastructure performance alarm thresholds that are correlated to predicting subsequent ACH processing problems, the present invention can correct infrastructure related problems prior to the occurrence of ACH processing problems.

Presentation zone one 1202 includes the navigation panel shown and described in relation to FIG. 5. Elements 1308-1330 of FIG. 13 are equivalent to elements 508-530 of FIG. 5 and, therefore, for the sake of brevity, the discussion related to these elements is not repeated in the discussion FIG. 13. In the illustrated example of FIG. 13 the "infrastructure" monitoring activity identifier or the associated alarm message indicator 1326 has been user-activated to result in the presentation of "infrastructure" monitoring results in presentation zone three 1306.

Presentation zone two 1304 includes the same ACH processing statistics/metrics shown and described in relating to presentation zone two 504 of FIG. 5. For the sake of brevity, the discussion related to the ACH processing performance statistics/metrics is not repeated in the discussion of FIG. 13.

Presentation zone three 1306 includes monitoring results for an "infrastructure" monitoring activity which monitors the performance of various infrastructure components associated with ACH processing. In the illustrated example shown in FIG. 13, the performance characteristics include Central Processing Unit (CPU) capacity, throughput rate, and memory usage, although other performance characteristics may be monitored and form the basis for alarms/exceptions. If one or more performance characteristics are determined to meet or exceed a predetermined performance threshold, an exception/alarm results and an alarm message is generated. In the illustrated embodiment of FIG. 13, presentation zone three 1306 includes a plurality of monitored infrastructure components or applications defined by a source name such as trx, transfer station, file processor, message processor and check conversion or the like. Each listed infrastructure component has an associated alarm message indictor that indicates, which provides a visual indication of whether an alarm is currently associated with the infrastructure component. For example, if an alarm/exception currently exists for the related infrastructure component, the alarm message indictor may be configured to change color to indicate presence of an alarm/exception. For example, alarm message indicator 1340 is associated with trx infrastructure component, alarm message indicator 1342 is associated with transfer station component, alarm message indicator 1344 is associated with file processor component, alarm message indicator 1346 is associated with message processor component and alarm message indicator 1348 is associated with check conversion component.

Similar to the presentation zone three 506 of FIG. 5, the presentation zone three 1306 of FIG. 13 provides for display of confidence index indicator 1360, exceptions button 1370 and all button 1380. In the illustrated example of FIG. 13 in which "infrastructure" is the monitored activity, activating exception button 1370 will provide for presentation of the currently outstanding exceptions/alarms associated with infrastructure. Additionally, in the illustrated example of FIG. 13 in which "infrastructure" is the monitored activity the all exceptions/alarms would include current outstanding exceptions/alarms associated with infrastructure and previous exceptions/alarms associated with the infrastructure that have been subsequently addressed.

Further, in the illustrated embodiment of FIG. 13 the data element bar 1390 differs from other data element bars, in that, it includes headers for the performance data displayed in presentation zone three 1306, as opposed to data included in the alarm messages. The data elements/headers in data element bar 1390 include but, are not necessarily limited to, application source name, CPU capacity, throughput rate, memory usage and a time of last update and the like.

FIG. 14 provides an example of an ACH monitoring dashboard 1400 configured to present ACH monitoring results and, specifically graphs representing ACH monitoring statistics/metrics.

Presentation zone one 1402 includes a listing of shared ACH processing platform related monitoring statistics/metrics. A check box located adjacent to a shared ACH processing platform monitoring statistic/metric indicates that a graph associated with the statistic/metric is available for display in presentation zone three 1406. Once a user activates a check-box, the corresponding graph is displayed in presentation zone three 1406. In the illustrated example shown in FIG. 14 the check boxes associated with the collected transactions and outstanding file exceptions have been activated and the corresponding collected transaction graph 1410 and outstanding file exception graph 1420 are displayed in presentation zone three 1406. It is also noted presentation zone one 1402 provides for a scrollable list of shared ACH processing platform statistics/metrics.

Presentation zone two 1404 includes a listing of financial institution transfer station related monitoring statistics/metrics. A check box located adjacent to a financial institution monitoring statistic/metric indicates that a graph associated with the statistic/metric is available for display in presentation zone three 1406. Once a user activates a check-box, the corresponding graph is displayed in presentation zone three 1406. In the illustrated example shown in FIG. 14 the check boxes associated with the total files received and new company level exceptions have been activated and the corresponding total files received graph 1430 and new company level exception graph 1440 are displayed in presentation zone three 1406. It is also noted presentation zone one 1402 provides for a scrollable list of financial institution statistics/metrics. In the illustrated example of FIG. 14, the monitoring statistic/metric for new company level exception is outside of the viewable displayed area and, thus, requires scrolling for that particular monitoring statistic to come into the displayable area.

In addition, the current tab 1450 and the previous tab 1460 allow the user to choose between current intraday monitoring statistics/metrics or previous day (or any other historical date in the database) monitoring statistics/metrics.

Presentation zone three 1406 provides for presentation of the graphs selected from presentation zones one and two 1402, 1404. As previously noted, in the illustrated example, four graphs are presented in presentation zone three 1406, including collected transaction graph 1410, outstanding file exceptions graph 1420, total files received graph 1430 and new company level exceptions 1440.

FIG. 15 provides an example of an ACH monitoring dashboard 1500 configured to provide a research repository for determining the status of ACH files, in accordance with an embodiment of the present invention. The dashboard includes file to tab 1502 and files from tab 1504, which are configured to allow the user to choose between searching for a file or files communicated from the financial institution transfer station to the shared ACH processing platform (i.e., files to) and a file or files communicated from the shared ACH processing platform to the financial institution transfer station (i.e., files from).

The dashboard additionally includes day selection 1506 that is configured to allow the user to select the day associated with the processing of the file or files that the user is attempting to search the status of. In the illustrated embodiment of FIG. 15, day selection 1506 is configured to allow the user to choose from a seven day window, typically the previous six days and the current day. The research repository further provides for a search criteria defining dropdown menu that is configured to allow the user to select from a predetermined list one or more criteria for search for one or more desired file(s). If the user chooses to search the files to database, the search criteria in the dropdown menu may be as listed in files to list 1522 and if the user chooses to search the files from database, the search criteria in the dropdown menu may be as listed in file from list 1524. Files to list 1522 includes, but is not limited to, file creation date/time; file receipt date and time, exception code, file source, file serial, logical file number, file type, file schedule ID, file name, file ID, dataset name, credit item volume and amount, debit item volume and amount, sent time, transmission acknowledgement data and time, cnotes, in, cnotes in date and time, cnotes out, cnotes out date and time, cycle time and the like. Files from list 1524 includes but is not limited to, file creation date/time; file receipt date and time, exception code, file source, file serial, file type, file schedule ID, file name, file ID, dataset name, credit item volume and amount, debit item volume and amount, transmission acknowledgement data and time, and the like. In addition, the research repository dashboard 1500 may include a more criteria input mechanism 1510 that is configured to be activated by a user to provide further user-defined search criteria.

Additionally, the research repository dashboard 1500 may include a group by selector 1512 that is configured to allow a user to choose the criteria used to group or otherwise sort the results of the file search. In addition, the research repository dashboard 1500 may provide for an export user input mechanism 1520 configured to allow the user to choose to export the results of the search. In the illustrated embodiment of FIG. 15, the results of the search may be exported to a spreadsheet application or the like.

Thus, systems, apparatus, methods, and computer program products herein described provide for monitoring activities related to Automated Clearing House (ACH) processing and, in specific embodiments, monitoring activities related to ACH in processing in shared ACH processing environment in which two or more financial institutions share access to the shared ACH processing platform. The monitoring provides for determining that events associated with a respective monitored ACH processes trigger a respective alarm, generating the alarm messages based on the triggering events and providing for computer network access to results of the monitoring including the one or more alarm messages. As such the present invention provides real-time visibility to process owners regarding the health of their processes. Thereby, allowing the process owners the ability to address processing problems as they occur and mitigate overall risk involved in the processing.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for managing Automated Clearing House (ACH) processing, the method comprising:
 a financial-institution-based ACH transfer station including a financial institution ACH file landing zone, a shared ACH processing platform landing zone, a file processor and transfer station storage; and
 an ACH monitoring apparatus including at least one processor and a memory, wherein the memory includes,
  an ACH monitoring application configured to monitor a plurality of activities occurring at the ACH transfer station by querying the transfer station storage on a predetermined interval, determine that one or more events associated with a respective monitored activity trigger a respective alarm and, in immediate response to determining that the one or more events trigger the respective alarm, generate and initiate communication of one or more alarm messages, and
  an ACH monitoring dashboard application configured to receive the one or more alarm messages communicated from the ACH monitoring application and provide computer network access to a dashboard display of real-time results of the monitoring including the one or more alarm messages.

2. The system of claim 1, wherein the ACH monitoring dashboard application is further configured to provide for computer network access to results of the monitoring, wherein the results include at least one of processing statistics, intraday summary statistics, key performance indicators or graphical representations associated with processing statistics, intraday summary statistics or key performance indicators.

3. The system of claim 1, wherein the ACH monitoring dashboard application is further configured to provide for computer network access to a research repository that provides for searching of file status based on predetermined file criteria.

4. The system of claim 1, wherein the ACH monitoring dashboard application is further configured to provide for computer network access to results of the monitoring, wherein the results include a confidence indicator that indicates the confidence of the monitoring process.

5. The system of claim 1, further comprising an infrastructure monitoring apparatus including at least one processor and a memory, wherein the memory includes an infrastructure monitoring application configured to monitor performance of infrastructure components associated with ACH processing, determine that performance of one or more infrastructure components meets a predetermined performance threshold and generate one or more infrastructure alarm messages based on respective infrastructure components meeting the predetermined performance threshold.

6. The system of claim 5, wherein the ACH monitoring dashboard application is further configured to provide for computer network access to the infrastructure alarm messages.

7. The system of claim 1, wherein the ACH monitoring application is further configured to monitor acknowledgement of outbound ACH files sent from the ACH transfer station to a shared ACH processing platform and acknowledgement of inbound ACH files sent from the shared ACH processing platform to the ACH transfer station.

8. The system of claim 7, wherein the ACH monitoring application is further configured to determine that a file acknowledgement has not been received by the financial institution or generated by the financial institution within a predetermined time threshold and generate a file acknowledgement alarm message based on the determination.

9. The system of claim 8, wherein the ACH monitoring dashboard application is further configured to provide computer network access to the file acknowledgement alarm message.

10. The system of claim 1, wherein the ACH monitoring application is further configured to monitor compliance of a file received by the ACH transfer station or received by a shared ACH processing platform.

11. The system of claim 10, wherein the ACH monitoring application is further configured to determine that a file received by the ACH transfer station is non-compliant or receive notification from the shared ACH processing platform that a file is non-compliant and generate a non-compliant file alarm message based on the determination.

12. The system of claim 11, wherein the ACH monitoring dashboard application is further configured to provide computer network access to the non-compliant file alarm message.

13. The system of claim 1, wherein the ACH monitoring application is further configured to monitor receipt of scheduled files sent from an internal source to the ACH transfer station on predetermined schedules and receipt of scheduled files sent from a shared ACH processing platform to the ACH transfer station.

14. The system of claim 13, wherein the ACH monitoring application is further configured to determine that a scheduled file to be sent from the internal source or the shared ACH processing platform has not been received within a predetermined time threshold and generate a scheduled file alarm message based on the determination.

15. The system of claim 14, wherein the ACH monitoring dashboard application is further configured to provide network access to the scheduled file alarm message.

16. The system of claim 1, wherein the ACH monitoring application is further configured to monitor a volume of files received at the financial institution ACH file landing zone versus a volume of files sent by the financial institution ACH file landing zone or a volume of files received at the shared ACH processing platform landing zone versus a volume of files sent by the shared ACH processing platform landing zone.

17. The system of claim 16, wherein the ACH monitoring application is further configured to determine that the volume of files received at either the financial institution ACH file landing zone or the shared ACH processing platform is not equivalent to volume of files sent by the financial institution ACH file landing zone or the shared ACH processing platform and generate an outgoing alarm message based on the determination.

18. The system of claim 17, wherein the ACH monitoring dashboard application is further configured to provide computer network access to the outgoing alarm message.

19. The system of claim 1, wherein the ACH monitoring application is further configured to monitor occurrence and frequency of invoking file control activities at the ACH file landing zone and the shared ACH processing platform landing zone.

20. The system of claim 19, wherein the ACH monitoring application is further configured to determine that a predetermined file control activity has occurred or that a predetermined volume of file control activities has occurred over a predetermined time period and generate a file control alarm message based on the determination.

21. The system of claim 20, wherein the ACH monitoring dashboard application is further configured to provide computer network access to the file control alarm message.

22. The system of claim 1, wherein the ACH monitoring application is further configured to monitor a plurality of reoccurring events performed at the ACH transfer station and the at the shared ACH processing platform.

23. The system of claim 22, wherein the ACH monitoring application is further configured to determine that one or more of the reoccurring events have not been initiated or completed within a predetermined time and generate a service delivery alarm message based on the determination.

24. The system of claim 23, wherein the ACH monitoring dashboard application is further configured to provide computer network access to the service delivery alarm message.

25. An apparatus for managing Automated Clearing House (ACH) processing, the apparatus comprising:
   a computer platform including at least one processor and a memory; and
   an ACH monitoring dashboard application stored in the memory, executable by the processor and configured to provide computer network access to a dashboard display of real-time ACH process monitoring results including a plurality of alarm messages associated with ACH processing events, wherein the ACH dashboard application is further configured to present the ACH process monitoring results in a (1) first zone area configured to display alarm message type icons that indicate the current state of alarm messages for each alarm message type, (2) a second zone area configured to display real-time ACH processing statistics and (3) a third zone area configured to display alarm messages or access to alarm messages for a specific monitoring activity.

26. The apparatus of claim 25, wherein the ACH dashboard application is further configured to display the first zone area proximate an upper-left hand corner, display the second zone area proximate a lower-left hand corner and display the third zone area on a right-side adjacent to the first zone area and the second zone area.

27. The apparatus of claim 25, wherein the ACH monitoring dashboard application is further configured to present at least one of processing statistics, intraday summary statistics, key performance indicators or graphical representations associated with processing statistics, intraday summary statistics or key performance indicators.

28. The apparatus of claim 25, wherein the ACH monitoring dashboard application is further configured to present a research repository that is configured to provide for searching of file status based on predetermined file criteria.

29. The apparatus of claim 25, wherein the ACH monitoring dashboard application is further configured to present a confidence indicator that indicates a real-time confidence of the monitoring process.

30. The apparatus of claim 25, wherein the ACH monitoring dashboard application is further configured to present ACH processing infrastructure component performance indicators and infrastructure alarm messages.

31. A method for managing Automated Clearing House (ACH) processing, the method comprising:
monitoring, by a computing device, a plurality of Automated Clearing House (ACH) processes;
determining, by a computing device, that one or more events associated with a respective monitored ACH process trigger a respective alarm;
in immediate response to determining that the one or more events trigger the respective alarm, generating and initiating communication, by a computing device, of one or more alarm messages; and
providing for computer network access to a dashboard display of real-time results of the monitoring including the one or more alarm messages.

32. The method of claim 31, wherein monitoring further includes monitoring, by the computing device, acknowledgement of outbound ACH files sent from a financial institution to a shared ACH processing platform and acknowledgement of inbound ACH files sent from the shared ACH processing platform to the financial institution.

33. The method of claim 32, wherein determining further comprises determining, by the computing device, that a file acknowledgement has not been received by the financial institution or generated by the financial institution within a predetermined time threshold.

34. The method of claim 33, wherein generating further comprises generating, by the computing device, a file acknowledgement alarm message that indicates failure to receive a file acknowledgement or failure to generate a file acknowledgement and wherein providing further includes providing computer network access to the file acknowledgement alarm message.

35. The method of claim 31, wherein monitoring further comprises monitoring, by the computing device, compliance of a file received by a financial institution or received by a shared ACH processing platform.

36. The method of claim 35, wherein determining further comprises determining, by the computing device, that a file received by the financial institution or the shared ACH processing platform is non-compliant.

37. The method of claim 36, wherein generating further comprises generating, by the computing device, a non-compliant file alarm message that indicates the non-compliance of a file received by the financial institution or the shared ACH processing platform and wherein providing further includes providing computer network access to the non-compliant file alarm message.

38. The method of claim 31, wherein monitoring further comprises monitoring, by the computing device, receipt of scheduled files sent from an internal source to a financial institution on predetermined schedules and receipt of scheduled files sent from a shared ACH processing platform to the financial institution.

39. The method of claim 38, wherein determining further comprises determining, by the computing device, that a scheduled file to be sent from the internal source or the shared ACH processing platform has not been received with a predetermined time threshold.

40. The method of claim 39, wherein generating further comprises generating, by the computing device, a scheduled file alarm message that indicates failure to receive a scheduled file from the internal source or the shared ACH processing platform and wherein providing further includes providing computer network access to the scheduled file alarm message.

41. The method of claim 31, wherein monitoring further comprises monitoring, by the computing device, volume of files received at the financial institution versus volume of files sent by the financial institution.

42. The method of claim 41, wherein determining further comprises determining, by the computing device, that the volume of files received at the financial institution is not equivalent to volume of files sent by the financial institution.

43. The method of claim 42, wherein generating further comprises generating, by the computing device, an outgoing alarm message that indicates that the volume of files received at the financial institution is not equivalent to volume of files sent by the financial institution and wherein providing further includes providing computer network access to the outgoing alarm message.

44. The method of claim 31, wherein monitoring further comprises monitoring, by the computing device, occurrence and frequency of invoking file control activities.

45. The method of claim 44, wherein determining further comprises determining, by the computing device, that a predetermined file control activity has occurred or that a predetermined volume of file control activities has occurred over a predetermined time period.

46. The method of claim 45, wherein generating further comprises generating, by the computing device, a file control alarm message that indicates occurrence of a file control activity or frequency of file control activities and wherein providing further includes providing computer network access to the file control alarm message.

47. The method of claim 31, wherein monitoring further comprises, monitoring, by the computing device, a plurality of reoccurring events associated with a financial institution and the shared ACH processing platform.

48. The method of claim 47, wherein determining further comprises determining, by the computing device, that one or more of the reoccurring events have not been initiated or completed within a predetermined time.

49. The method of claim 48, wherein generating further comprises generating, by the computing device, a service delivery alarm message that indicates that one or more reoccurring events have not been initiated or completed within the predetermined time and wherein providing further includes providing computer network access to the service delivery alarm message.

50. The method of claim 31, further comprising:
monitoring, by a computing device, performance of infrastructure components associated with ACH processing;
determining, by a computing device, that performance of one or more infrastructure components meets a predetermined performance threshold;
generating, by a computing device, one or more infrastructure alarm messages based on respective infrastructure components meeting the predetermined performance threshold; and
providing for computer network access to a dashboard display of real-time results of the monitoring including the infrastructure alarm messages.

51. The method of claim 31, wherein providing further comprises providing for computer network access to results of the monitoring including at least one of processing statistics, intraday summary statistics, key performance indicators or graphical representations associated with processing statistics, intraday summary statistics or key performance indicators.

52. The method of claim 31, wherein providing further comprises providing for computer network access to results of the monitoring including a research repository that provides for searching of file status based on predetermined file criteria.

53. The method of claim 31, wherein providing further comprises providing for computer network access to results of the monitoring including a confidence indicator that indicates the confidence of the monitoring process.

54. A computer executable non-transitory tangible storage medium having computer instructions to perform the steps for managing Automated Clearing House (ACH) processes, the method comprising:
monitoring a plurality of Automated Clearing House (ACH) processes;
determining that one or more events associated with a respective monitored ACH process trigger a respective alarm;
in immediate response to determining that the one or more events trigger the respective alarm, generating and initiating communication of one or more alarm messages based on the triggering events; and
providing for computer network access to a dashboard display of real-time results of the monitoring including the one or more alarm messages.

55. The computer program product of claim 54, wherein monitoring further comprises monitoring one or more of acknowledgement of outbound ACH files sent from a financial institution to a shared ACH processing platform, acknowledgement of inbound ACH files sent from the shared ACH processing platform to the financial institution, compliance of a file received by a financial institution or received by a shared ACH processing platform, receipt of scheduled files sent from an internal source to a financial institution on predetermined schedules and receipt of scheduled files sent from a shared ACH processing platform to the financial institution, volume of files received at the financial institution versus volume of files sent by the financial institution, occurrence and frequency of invoking file control activities or a plurality of reoccurring events associated with a financial institution and the shared ACH processing platform.

56. The computer program product of claim 55, wherein generating further comprises generating one or more of file acknowledgement alarm messages, non-compliant file alarm messages, scheduled file alarm messages, outgoing alarm messages, a file control alarm messages, service delivery alarm messages or infrastructure alarm messages based on the triggering events.

57. The computer program product of claim 54, wherein providing further comprises providing for computer network access to results of the monitoring, wherein the results include at least one of processing statistics, intraday summary statistics, key performance indicators or graphical representations associated with processing statistics, intraday summary statistics or key performance indicators.

58. The computer program product of claim 54, wherein providing further comprises providing for computer network access to results of the monitoring including a research repository that provides for searching of file status based on predetermined file criteria.

59. The computer program product of claim 58, wherein providing further comprises providing for computer network access to results of the monitoring including a confidence indicator that indicates the confidence of the monitoring process.

* * * * *